United States Patent [19]

Uehara et al.

[11] Patent Number: 5,659,376
[45] Date of Patent: Aug. 19, 1997

[54] LIQUID CRYSTAL DISPLAY APPARATUS IN WHICH A NON-TRANSMISSIVE ELASTIC MEMBER SURROUNDING A DISPLAY AREA IS DISPOSED BETWEEN A VIEWER SIDE LIGHT TRANSMISSIVE PLATE AND THE LCD

[75] Inventors: Makoto Uehara, Zama; Hidetarou Tsuchiya; Hisao Tajima, both of Yokohama; Hiroyuki Yokomizo; Hiroshi Takabayashi, both of Atsugi; Shigeki Yabu, Machida; Toshiaki Itazawa, Yamato; Mitsuo Iwayama, Odawara; Yoshihiro Onitsuka, Hiratsuka; Yasushi Shioya, Atsugi, all of Japan

[73] Assignee: Canon Kabushiki Kaisha, Tokyo, Japan

[21] Appl. No.: 288,308

[22] Filed: Aug. 10, 1994

[30] Foreign Application Priority Data

| Aug. 10, 1993 | [JP] | Japan | 5-219144 |
| Sep. 28, 1993 | [JP] | Japan | 5-265733 |
| Dec. 15, 1993 | [JP] | Japan | 5-342971 |
| Mar. 24, 1994 | [JP] | Japan | 6-079582 |

[51] Int. Cl.⁶ .............. G02F 1/1333; G02F 1/1335; G01D 11/28; H04N 5/64
[52] U.S. Cl. ................ 349/58; 349/60; 349/64; 362/30; 348/794
[58] Field of Search .............. 348/794; 359/48, 359/49, 69, 83; 362/29, 330, 30; 349/58, 60, 64

[56] References Cited

U.S. PATENT DOCUMENTS

| 4,272,838 | 6/1981 | Kasama et al. | 368/88 |
| 4,392,747 | 7/1983 | Kumada et al. | 368/88 |
| 4,663,670 | 5/1987 | Ito et al. | 348/794 |
| 4,789,774 | 12/1988 | Koch et al. | 359/48 |
| 5,119,204 | 6/1992 | Hashimoto et al. | 348/794 |
| 5,168,384 | 12/1992 | Genba | 359/83 |
| 5,583,681 | 12/1996 | Shioya et al. | 349/60 |

FOREIGN PATENT DOCUMENTS

| 0435343 | 7/1991 | European Pat. Off. | 359/48 |
| 3025784 | 2/1982 | Germany . | |
| 02093425 | 4/1990 | Japan . | |
| 03203773 | 9/1991 | Japan . | |
| 04106529 | 4/1992 | Japan . | |
| 2176041 | 12/1986 | United Kingdom . | |

OTHER PUBLICATIONS

W.D. Apgar, Technical Digest, Western Electric No. 67 (Jul. 1982) 1–2.
Patent Abstracts of Japan, vol. 14, No. 449 (Sep. 1990) (P-1111).
Patent Abstracts of Japan, vol. 15, No. 20 (Jan. 1991) (P-1154).
Motorola Inc. Technical Developments, vol. 16 (Aug. 1992) (P. 25).

Primary Examiner—William L. Sikes
Assistant Examiner—Walter J. Malinowski
Attorney, Agent, or Firm—Fitzpatrick, Cella, Harper & Scinto

[57] ABSTRACT

A liquid crystal display apparatus is constituted by: a housing; a liquid crystal panel comprising a liquid crystal disposed between a pair of substrates each provided with electrodes, the liquid crystal panel being affixed to the housing; and a backlight for illuminating the liquid crystal panel, detachably affixed to the housing. A light-transmissive plate, such as a diffusion plate, allowing transmission of light from the backlight is further disposed between the liquid crystal panel and the backlight so as to define an almost closed first space in cooperation with the liquid crystal panel, whereby the first space retains its almost closed state even when the backlight is detached from the housing.

18 Claims, 12 Drawing Sheets

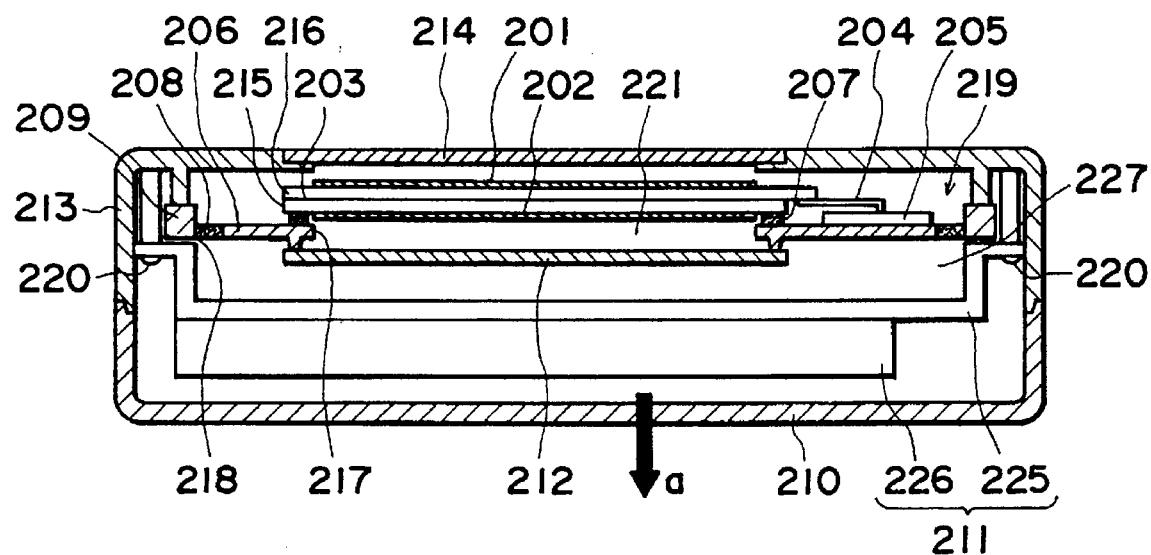
F I G. 17
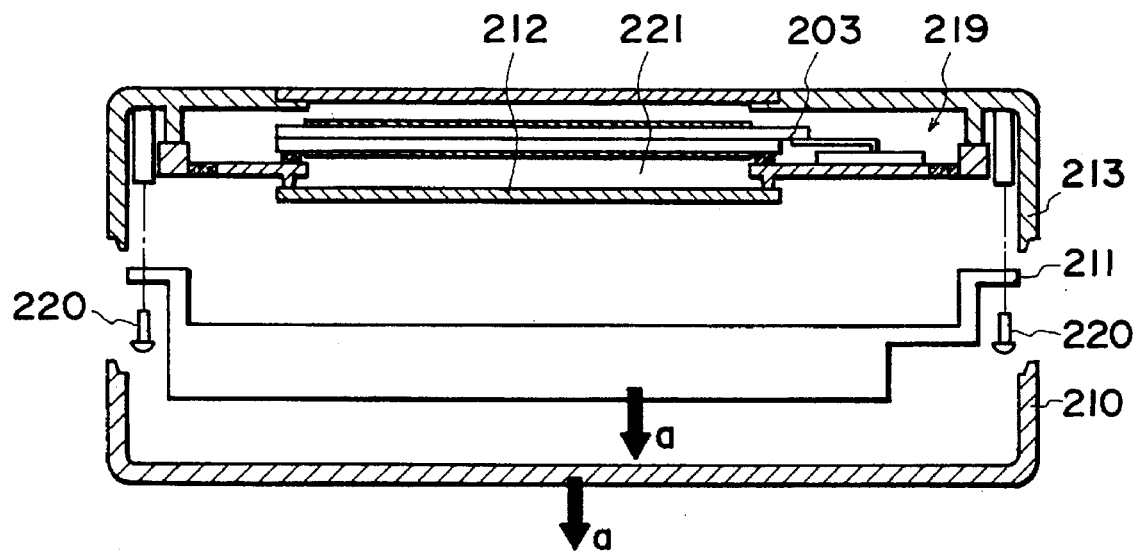
F I G. 18

LIQUID CRYSTAL DISPLAY APPARATUS IN WHICH A NON-TRANSMISSIVE ELASTIC MEMBER SURROUNDING A DISPLAY AREA IS DISPOSED BETWEEN A VIEWER SIDE LIGHT TRANSMISSIVE PLATE AND THE LCD

FIELD OF THE INVENTION AND RELATED ART

The present invention relates to a liquid crystal display apparatus.

Hitherto, various forms of liquid crystal display apparatus have been proposed as disclosed in Japanese Laid-Open Patent Application (JP-A) 2-93425, JP-A 3-203773 and JP-A 4-106529. FIG. 1 shows an example of such apparatus.

Referring to FIG. 1, the liquid crystal display apparatus includes a liquid crystal panel 101 and a backlight device 100B, respectively housed in a cover 110. The liquid crystal panel 101 comprises a pair of glass substrates 101a and 101b sandwiching a liquid crystal. The two glass substrates 101a and 101b are respectively provided with transparent electrodes at their inner surfaces. Polarizers 107 and 108 are applied onto both sides of the liquid crystal panel 101. To a side of the liquid crystal panel 101, a flexible printed wire film ("TAB film") 103 loaded with a drive IC is connected, and a peripheral circuit plate 102 of a drive IC for driving the liquid crystal panel 101 is connected to the TAB film 103. On the other hand, the backlight device 100B includes fluorescent lamps 104, a reflection plate 105 and a diffusion plate 106 so that a light flux from a fluorescent lamps 104 is reflected by the reflection plate 105, diffused by the diffusion plate 106 and then cast at a uniform luminance onto the liquid crystal panel 101. The liquid crystal panel 101 is fixed onto the cover 100 composed of a plate metal or a resin via a cushioning member 109 comprising, e.g., rubber.

In the above-described type of liquid crystal display apparatus, only the cushioning member 109 is disposed between the liquid crystal panel 101 and the cover 110, and a vibration or impact applied to the cover 110 is transmitted to the liquid crystal panel 101 without substantial attenuation, so that the liquid crystal panel 101 receiving a mechanical stress is liable to cause a degradation in display quality. The liquid crystal injected into the liquid crystal panel 101 may be a nematic liquid crystal or a ferroelectric liquid crystal, of which the ferroelectric liquid crystal is weaker against a mechanical stress compared with the nematic liquid crystal. Accordingly, the above difficulty is particularly pronounced in the liquid crystal display apparatus using a ferroelectric liquid crystal.

In order to solve the above problem, a liquid crystal display apparatus as shown in FIG. 2 has been proposed.

In the liquid crystal display apparatus shown in FIG. 2, cushioning members (an adhesive 113 and a resin 115 described hereinafter) for supporting a liquid crystal panel 101 are disposed in two layers, and an almost closed space 100A1 is formed below the liquid crystal panel 101 so as to cause an air damper effect (details of which will be described later), thereby increasing the performances of attenuating the vibration and/or impact.

More specifically, the liquid crystal display apparatus shown in FIG. 2 is equipped with a fixing plate 112 which is provided with an opening 112a and remains like a picture frame. The liquid crystal panel 101 having a structure described above is applied onto the fixing plate 112 with an elastic adhesive 113 applied at all the peripheral part surrounding the opening 112a, whereby the opening 112a is stopped by the liquid crystal panel 101. The above-mentioned peripheral circuit plate 102 is fixed onto the fixing plate 112. Surrounding the fixing plate 112, a frame member 114 is disposed with a prescribed spacing, and the fixing plate 112 is supported in the form of being hanged in space with the frame member 114 via an elastic resin 115. Further, above the frame member 114, a frame-shaped fixing plate 125 provided with a central opening is fixed, and the opening of the fixing plate 125 is stopped with a protective plate 111 comprising a transparent sheet like that of glass. On the lower side of the protective plate 111, a polarizer 118 is applied. On the other hand, on the lower part of the frame member 114, a backlight device 100B is affixed, and an almost closed space 100A1 is defined by the backlight device 100B, the liquid crystal panel 101, the fixing plate 112, etc. On the upper surface of the diffusion plate 106, a polarizer 119 applied onto a transparent sheet of glass, etc., is disposed.

When a vibration or impact is applied to the frame member 114 in the above-described liquid crystal display apparatus, the vibration, etc., is attenuated by the resin 115 and adhesive 113 and not substantially transmitted to the liquid crystal panel 101. Further, even if the liquid crystal panel 101 is vibrated to some extent, the vibration is quickly attenuated by the air damper effect due to air within the almost closed space 100A1. More specifically, when the liquid crystal panel 101 is vibrated, the space 100A1 causes repetitive contraction and expansion, the contraction and expansion function as a resistance to the vibration of the liquid crystal panel 101 due to the almost closed state of the space 100A1, so that the vibration is quickly attenuated while receiving a cushioning effect of the space 100A1. In this way, the liquid crystal panel 101 is protected from a mechanical stress and is thus free from a deterioration in display quality due to such a mechanical stress.

Incidentally, in case of a liquid crystal panel having a low transmittance, such as a color liquid crystal panel, it is necessary to use a backlight device 100B equipped with high-luminance fluorescent lamps 104 in order obtain a desired level of luminance. In case of using intensified luminance fluorescent lamps 104, the lamps 104 are supplied with an increased load, and thus the life of the fluorescent lamps 104 is shortened, so that it becomes necessary to frequently exchange the whole backlight device 100B and the fluorescent lamps 104.

At the time of exchanging the backlight device 100B, however, it is necessary to detach the backlight device 100B from the upper (or remaining) part (inclusive of the liquid crystal panel 101, frame member 114, etc.) as shown in FIG. 3. As a result, the closed state of the almost closed space 100A1 formed below the liquid crystal panel 101 is temporarily broken and the lower surface of the liquid crystal panel 101 is exposed, whereby dust or dirt is liable to attach to the lower surface. The attached dust, etc., even if it is sufficiently small as not recognized by human eyes, can cause display defects, and a wiping operation as required for removing the attached dust is not desirable as it applies an external force to the panel 103. Particularly, in case of a liquid crystal display apparatus using a ferroelectric liquid crystal, the alignment of the liquid crystal is liable to be disordered, thus failing to provide a display. On the other hand, if the exchange of a backlight device 100B is performed in a clean room so as to obviate the dust attachment, the operation becomes troublesome and not practical.

FIG. 4 shows another example of known liquid crystal display apparatus. Referring to FIG. 4, the liquid crystal display apparatus includes a liquid crystal panel 203 comprising a liquid crystal disposed between a pair of substrates 215 and 216 each provided with electrodes. The liquid crystal panel 203 is provided with polarizing films 201 and 202 applied onto both sides thereof and also has a function of a polarizer. To a side of the liquid crystal panel 203, a flexible printed wire film ("TAB film") 204 loaded with a drive IC is connected, and a peripheral circuit plate 205 for a drive IC for driving the liquid crystal panel 203 is connected to the TAB film 204. On the other hand, the liquid crystal display apparatus is equipped with a panel-fixing plate 206, and the panel-fixing plate 206 is provided with an opening 217. At the entire periphery of the panel-fixing plate 206 surrounding the opening, an elastomeric adhesive 207 is applied so as to fix the liquid crystal panel 203 onto the panel-fixing plate, so that the liquid crystal panel 203 stops the opening 217. Further, the panel-fixing plate 206 is supported in the form of being hanged in space by a fixing plate-supporting member 209 via an elastic member 208 and, to the lower part of the fixing plate-supporting member 209, a backlight unit 211 is affixed and, below the liquid crystal panel 203, an almost closed space 200A is defined by the panel-fixing plate 206, the fixing plate-supporting member 209, the backlight unit 211, the adhesive 207 and the elastic member 208.

The backlight unit 211 includes tubular lamps such as thermal cathode tubes (not shown) and a diffusion plate 212 above the lamps. The diffusion plate 212 is used to scatter and diffuse light from the lamps so that the scattered and diffused light is caused to illuminate the liquid crystal panel 203. The above-described backlight unit 211, liquid crystal panel 203, etc., are fixed to a housing 210 of the apparatus.

The above-described liquid crystal apparatus shown in FIG. 4 has the following advantageous features.

(1) The liquid crystal panel 203 is supported by the elastic member 208 so that, even if the housing 210 is supplied with an impact, the vibration is not readily transmitted to the liquid crystal panel 203.

(2) Even when the liquid crystal panel 203 is directly supplied with an external force, the liquid crystal panel 203 supported in hanging with the elastic member 208 is allowed to move to some extent, so that the ill effects given by the external force, such as a deterioration in alignment of liquid crystal due to warping of the liquid crystal panel 203, can be minimized.

(3) Further, because of the almost closed space 200A formed below the liquid crystal panel 203, the vibration of the liquid crystal panel 203 can be quickly attenuated due to the air damper effect of the space 200A. More specifically, in case where the liquid crystal panel 203 is vibrated to move in a direction of an arrow "–Z" shown in FIG. 5, the liquid crystal panel 203 receives a resisting force from the closed space 200A to be compressed. Also, in case where the liquid crystal panel 203 is caused to move in a direction of an arrow "+Z", the panel also receives a similar resisting force so that the vibration of the liquid crystal panel 203 is quickly attenuated. As a result, the deformation of the liquid crystal panel 203 is reduced to suppress the deterioration of alignment and image quality.

(4) Further, as the closed space is formed, the attachment of dust or dirt onto the lower surface the liquid crystal panel 203 (more exactly, the lower surface of the polarizer film thereof) can be prevented, thereby preventing the deterioration in display quality.

Incidentally, increases in contrast and brightness of a liquid crystal panel 203 have been desired in these years and accordingly the backlight unit 211 is desired to use a lamp of a higher luminance. On the other hand, it is also known that a lamp of a higher luminance is caused to have a shorter life because of an increased load (e.g., ca. 10000 hours in case of a thermal cathode tube). Accordingly, in such a case, frequent exchange of lamps is required. More specifically, it is necessary to exchange the backlight unit 211 in a state where an upper part (including the liquid crystal panel 203, the fixing plate-supporting member 209, etc.) of the liquid crystal display apparatus is taken apart from the housing 210, as shown in FIG. 6.

However, at the time of the exchange of the backlight unit, the surface of the liquid crystal panel 203 (the lower surface of the polarizer film) is exposed, so that dust or dirt is liable to attach thereto. The attached dust etc., even if it is small enough to be not recognized by human eyes, can cause display defects, and a wiping operation required for removing the attached dust is not desirable as it applied an external force to the panel. Further, if the backlight unit is exchanged in a clean room so as to obviate the dust attachment, the operation becomes troublesome and impractical.

Incidentally, there is a relationship as represented by the following equation (with reference to FIG. 7) between an effective luminescent region L of a backlight and a distance d between the back surface of the liquid crystal panel 203 and the luminescent surface of the backlight unit 211:

$$L = L0 + 2d \times \tan\theta + t \times \tan\phi,$$

wherein $d \gg t$,

L0: display region of the liquid crystal panel t: the liquid crystal panel thickness $\theta$: viewing angle of the liquid crystal panel $\phi$: refraction angle.

In the case where the liquid crystal panel 203 is supported in a hanged state together with the panel-fixing plate 206 as in the above-described example, the spacing d changes along with the vibration of the liquid crystal panel 203, so that it is necessary to increase the effective luminescent region L while taking the maximum value of the spacing d into consideration. As a result, there arises a difficulty that the backlight unit is enlarged in capacity.

FIG. 8 shows another example of known liquid crystal display apparatus including a liquid crystal panel and a backlight device supported integrally. Referring to FIG. 8, the liquid crystal display apparatus 301 includes an upper housing 302 including an opening 302a and a transparent display plate (transparent part) 303 stopping the opening 302a. The inner side of the upper housing 302 is provided with bosses 302b, to the lower ends of which a panel-fixing member 305 is horizontally supported. The fixing member 305 is in the form of a picture frame surrounding a central opening 305a. On the lower surface of the fixing member 305, a liquid crystal panel 306 is applied with an adhesive 307 so as to stop the opening 305a. The liquid crystal panel 306 comprises two glass substrates 306a and 306b disposed opposite to each other so as to have transparent electrodes on their opposing sides, and a liquid crystal (not shown) disposed between the substrates 306a and 306b. The liquid crystal panel 306 has polarizing films (not shown) attached thereto on both sides. Further, to a side of the liquid crystal panel 306, a TAB film 309 loaded with a drive IC is connected, and a peripheral circuit substrate 310 for the driver IC for driving the liquid crystal panel 306 (hereinafter called "driver board 310") is connected to the TAB film 309.

The driver board 310 is screwed to the fixing member 305. On the other hand, to the lower surface of the fixing member 305, a backlight device 311 is affixed. As is known, the backlight device 311 includes fluorescent lamps, a reflection plate and a diffusion plate so as to illuminate the liquid crystal panel 306 at a uniform luminance. To the upper housing 302, a lower housing 312 is detachably supported, and the liquid crystal panel 306, etc., are housed within the housing 302 and 312.

In the above-described liquid crystal display apparatus, a prescribed spacing d is provided between the display plate 303 (the lower surface of the upper housing 302) and the liquid crystal panel 306 so that the display plate 303 will not touch the liquid crystal panel 306 even when the display plate is deformed by receiving an external force. A region outside the display region 300A of the liquid crystal panel 306 should desirably be not seen from the outside because of an improved appearance and, for this purpose, a portion in the non-display region 303C of the lower surface of the display plate is provided with a printed frame 313 for light interception.

A large spacing d between the display plate 303 (upper surface of the housing 302) and the liquid crystal panel 306 is not desirable because it gives an impression that the panel face is depressed inside. For this reason, it is a current practice to adopt a structure wherein the liquid crystal panel 306 is fixed on the upper surface of the fixing member 305 to provide a small spacing d as shown in FIG. 9.

However, in a liquid crystal display apparatus adopting the structure, there arises a difficulty that the inner materials inclusive of the TAB film 309 and driver board 310 can be easily recognized through the spacing as shown in FIG. 10, thus providing an awkward appearance.

Further, because of a decreased spacing d, it has been required to provide a rigid material for the display plate 303 in order to prevent the damage of the liquid crystal panel.

FIG. 11 shows another example of known liquid crystal display apparatus using a ferroelectric liquid crystal.

Referring to FIG. 11, the liquid crystal display apparatus 401 principally includes a liquid crystal cell 402, a fixing member (cell-supporting member) 403 for supporting the cell 402, and a backlight 405, which are supported by a fixing frame 406.

The cell 402 comprises a ferroelectric liquid crystal sandwiched between a pair of glass substrates each having thereon transparent electrodes and supplied with an aligning treatment. The fixing plate 403 is composed of, e.g., a plastic or metal plate, and is provided with an opening which is a little smaller than the cell 402. At a peripheral part surrounding the opening of the fixing plate 403, a rubber-type adhesive 407 is applied, and the cell 402 is applied therewith so as to stop the opening. The cell 402 is provided with an upper polarizer 409 and a lower polarizer 410 applied onto both sides. To the takeout electrodes of the cell 402, a flexible printed wire film 411 is connected, and a circuit substrate 412 for driving the cell 402 is electrically connected to the printed wire film 411. The circuit substrate 412 is fixed to the fixing plate 402 with screws, etc. Hereinafter, a unit including the fixing plate 403, the cell 402, the upper and lower polarizers 409 and 410, the printed wire film 411 and the circuit substrate 412, is called a "display unit U".

The display unit U is supported in the form of being hanged in space by the fixing frame 406 as the whole periphery of the fixing plate 403 is applied with the rubber-type adhesive 413. To the lower side of the fixing frame 406, the backlight 405 is affixed. A diffusion plate 408 is applied onto the surface of the backlight 405. An almost closed space 415 is defined by the backlight 405, the fixing frame 406, the fixing plate 403 and the cell 402, so that the vibration, if any, of the cell 403 is quickly attenuated due to the air damper effect of the almost closed space 415. To the upper part of the fixing frame 406, a display plate 417 is affixed via a cover 416, so as to protect the cell 402, etc., thereby.

In the liquid crystal display apparatus 401 constituted in the above-described manner, a rubber-type adhesive 413 is disposed between the fixing frame 406 and the fixing plate 403, and a similar elastic rubber-type adhesive 407 is disposed between the fixing plate 403 and the cell 402, so that an external impact or vibration can be attenuated by the adhesives 413 and 407, and is not readily transmitted to the cell 402. Further, as the almost closed space 415 is formed by the backlight 405, the fixing frame 406, the fixing plate 403 and the cell 402, a slight degree of vibration, if any, of the cell 402 can be quickly attenuated by the air damper effect of the almost closed space 415. As a result, the warping of the cell 402 is suppressed to the minimum, whereby the occurrence of alignment defects and lowering in display quality peculiarly encountered with a ferroelectric liquid crystal cell can be suppressed.

In the above-described liquid crystal display apparatus 401, the display unit U is supported by a rubber-type adhesive disposed on the four sides of the display unit U. Accordingly, there can arise a problem that the rubber adhesive 413 can cause a lowering in elasticity due to deterioration in long term use, thus failing to provide a complete attenuation of vibration and resulting in alignment defects in the cell 402. This problem is not so conspicuous if the cell 402 is as small as at most 15 inches but is conspicuous if the cell is as large as 20 inches or larger. Particularly, such a large size panel is generally used in an upright position as in a desktop word processor and, in such a case, the total weight of the display unit U is not dispersed to the entirety of the rubber-type adhesive but is concentrated at particular parts, at which the adhesive 413 is liable to cause an accelerated deterioration.

On the other hand, during the drive of a liquid crystal display apparatus, heat is generated from the cell 402, backlight 405 and circuit substrate 412. In case where an almost closed space 415 is formed surrounding the cell 402 as in the above example, the air surrounding the cell is prevented from convection, so that the temperature of the cell 402 is increased, thereby causing a deterioration of display quality.

As described above, the conventional liquid crystal display apparatus has been found to involve several technical problems, the solution of which given by the present invention will become apparent in view of the following description.

SUMMARY OF THE INVENTION

A first object of the present invention is to provide a liquid crystal display apparatus capable of preventing dust attachment onto a liquid crystal panel and facilitating the exchange of a backlight by disposing a light-transmissive plate in the vicinity of the liquid crystal panel so as to form a first almost closed space capable of retaining the closed state thereof even during the exchange of the backlight.

A second object of the present invention is to provide a liquid crystal display apparatus capable of preventing dust attachment onto a liquid crystal panel and reducing the size of a backlight by disposing a diffusion plate in the vicinity of a liquid crystal panel so as to define a closed space and retain the closed state of the space even during the exchange of the backlight.

A third object of the present invention is to provide a liquid crystal display apparatus having an elastic member disposed at a gap between the periphery of a liquid crystal panel and an upper housing so as to provide an improved appearance, and also an information transmission apparatus including such a liquid crystal display apparatus.

A fourth object of the present invention is to provide a ferroelectric liquid crystal display apparatus including a cell and a cell-supporting member supported in the form of being hanged in space with a spring so as to retain a vibration attenuation effect and allow air convection around the cell to suppress the temperature raise of the cell.

According to a first aspect of the present invention, there is provided a liquid crystal display apparatus, comprising:

a housing, a liquid crystal panel comprising a liquid crystal disposed between a pair of substrates each provided with electrodes, the liquid crystal panel being affixed to the housing, a backlight for illuminating the liquid crystal panel, detachably affixed to the housing, and a light-transmissive plate allowing transmission of light from the backlight, disposed between the liquid crystal panel and the backlight so as to define an almost closed first space in cooperation with the liquid crystal panel, the first space retaining its almost closed state even when the backlight is detached from the housing.

In this instance, it is preferred that the liquid crystal panel and the housing in combination define an almost closed second space, and the first space and the second space are disposed to sandwich the liquid crystal panel.

It is also preferred that a part of the housing opposing the liquid crystal panel is formed of glass.

It is possible to dispose an elastic member between the liquid crystal panel and the housing within the second space. The liquid crystal can be a ferroelectric liquid crystal.

In the liquid crystal display apparatus constituted in the above-described manner, the light-transmissive plate disposed in the vicinity of the liquid crystal panel defines an almost closed first space, of which the closed state is retained even when the backlight is exchanged, whereby dust, etc., are prevented from being attached onto the liquid crystal panel on its side confronting the backlight.

According to a second aspect of the present invention, there is provided a liquid crystal display apparatus, comprising:

a liquid crystal panel comprising a liquid crystal disposed between a pair of substrates each provided with electrodes, a backlight for illuminating the liquid crystal panel, a diffusion plate disposed between the backlight and the liquid crystal panel for diffusing light from the backlight, and a housing supporting the liquid crystal panel, the backlight and the diffusion plate, wherein the diffusion plate is disposed in the vicinity of the liquid crystal panel so as to define an almost closed space in combination with the liquid crystal panel.

In this instance, it is preferred that a supporting member having an opening is supported via an elastic member by the housing in the form of being hanged in space, the liquid crystal panel is affixed to the supporting member so as to cover one side of the opening, and the diffusion plate is affixed to the supporting member so as to cover another side of the opening, so that the liquid crystal panel, the supporting member and the diffusion plate in combination define the above-mentioned almost closed space.

In the liquid crystal display apparatus constituted in the above-described manner, even when the backlight is detached to be exchanged, dust, etc., are prevented from being attached to the liquid crystal panel on its side confronting the backlight because the diffusion plate disposed in the vicinity of the liquid crystal panel defines a closed space in cooperation with the liquid crystal panel. The disposition of the diffusion plate close to the liquid crystal panel has a similar effect as the disposition of the backlight closer to the liquid crystal panel.

According to a third aspect of the present invention, there is provided a liquid crystal display apparatus, comprising:

a liquid crystal panel comprising a liquid crystal disposed between a pair of substrates each provided with electrodes, a housing disposed to house the liquid crystal panel and equipped with a transparent portion so as to allow observation of the liquid crystal panel therethrough, the transparent portion and the liquid crystal panel confronting each other with a prescribed distance therebetween, wherein a nontransparent elastic member is disposed between the housing and the liquid crystal panel so as to surround a display region of the liquid crystal panel.

According to the present invention, there is also provided an information transmission apparatus, comprising: a graphic controller for outputting a data signal and a scanning scheme signal, a scanning signal control circuit for outputting scanning line address data and a scanning scheme signal, and the above-mentioned liquid crystal display apparatus.

In the above-described liquid crystal display apparatus, a nontransparent elastic member is disposed between the housing and the liquid crystal panel so as to surround a display region of the liquid crystal panel, so that the interior (non-display region) of the liquid crystal display apparatus is made non-observable regardless of a gap formed between the transparent portion of the housing and the liquid crystal panel.

According to a fourth aspect of the present invention, there is provided a ferroelectric liquid crystal display apparatus, comprising:

a liquid crystal cell comprising a ferroelectric liquid crystal disposed between a pair of substrates each provided with electrodes, a cell-supporting member for supporting the cell, a fixing frame for supporting the cell-supporting member, and a spring member disposed between the fixing frame and the cell-supporting member for hanging the cell-supporting member and the cell in space.

In this instance, it is preferred that the spring member comprises a metallic bar formed in a coil or a hairpin. It is also possible that the spring member comprises a so-called plate spring or a metallic plate formed in a U-shaped or a hairpin. It is further possible that the spring member comprises a resin or a composite material of a resin and a metal.

In the liquid crystal display apparatus constituted in the above-described manner, an external vibration or impact applied to the fixing frame is attenuated by the spring member and is not readily transmitted to the cell-supporting member or the cell. Further, the spring member does not readily lower its elasticity even in a long term of use so that its function of attenuating the vibration can be retained. Further, the spring member can be disposed between the fixing frame and the cell-supporting member without showing a space-sealing effect so that air convection is not hindered thereby.

These and other objects, features and advantages of the present invention will become more apparent upon a consideration of the following description of the preferred embodiments of the present invention taken in conjunction with the accompanying drawings, wherein like reference numerals are used to denote like parts.

BRIEF DESCRIPTION OF THE DRAWINGS

FIG. 17 is a sectional view of a liquid crystal display apparatus according to a third embodiment of the invention.

FIG. 18 is a sectional view for illustrating the state of exchanging the backlight in the apparatus according to the third embodiment.

DESCRIPTION OF THE PREFERRED EMBODIMENTS

Figure 1:
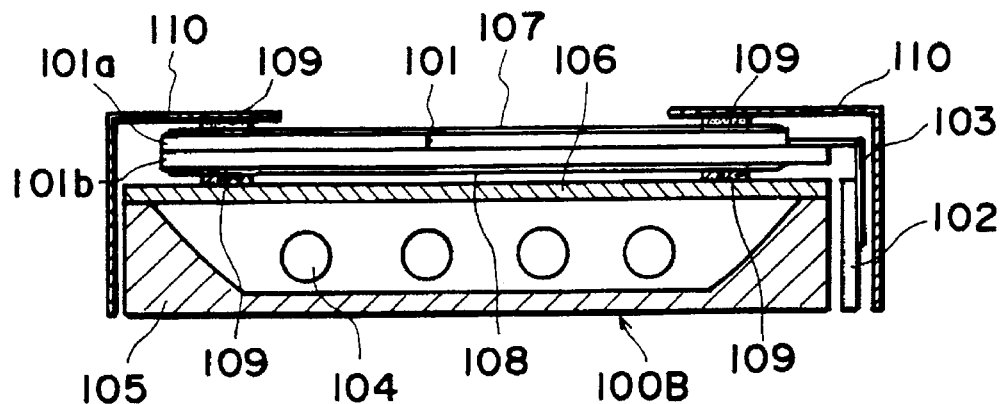
FIGS. 1, 2, 4 and 8 are sectional views each showing a structure of a known liquid crystal display apparatus.
Figure 2:
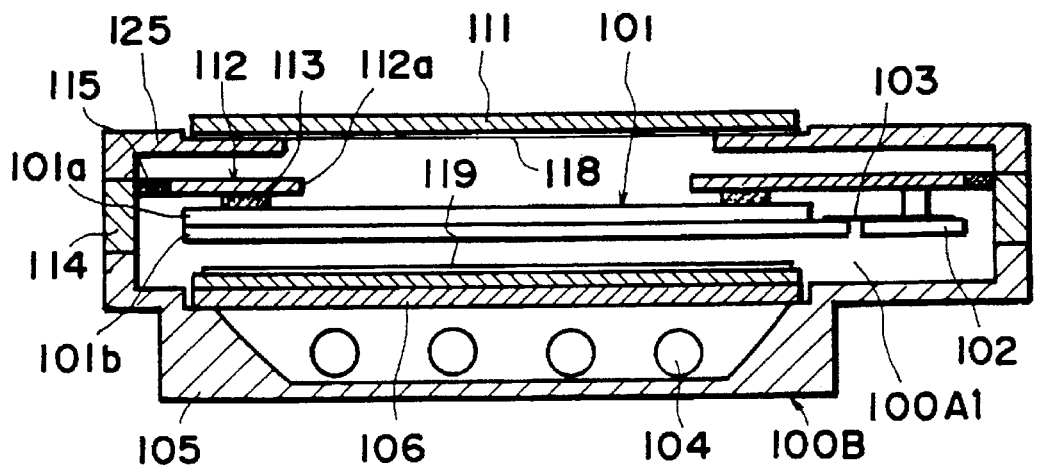
Figure 3:
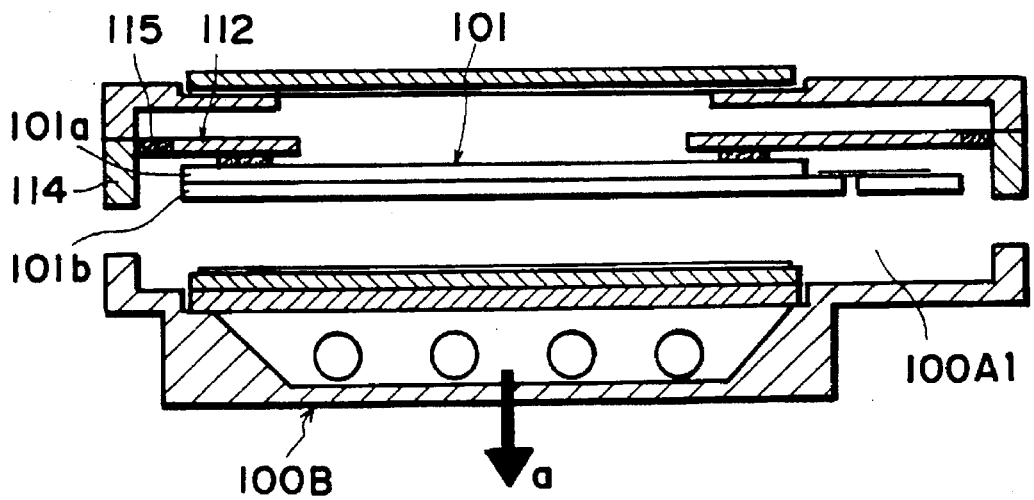
FIGS. 3 and 6 are sectional views illustrating the states of exchanging backlight devices in the apparatus of FIGS. 2 and 4, respectively.

A first embodiment of the present invention will now be described with reference to FIGS. 12 to 14 wherein like parts are denoted by like reference numerals as in FIGS. 1 and 2 and the explanation thereof may be omitted.

Figure 12:
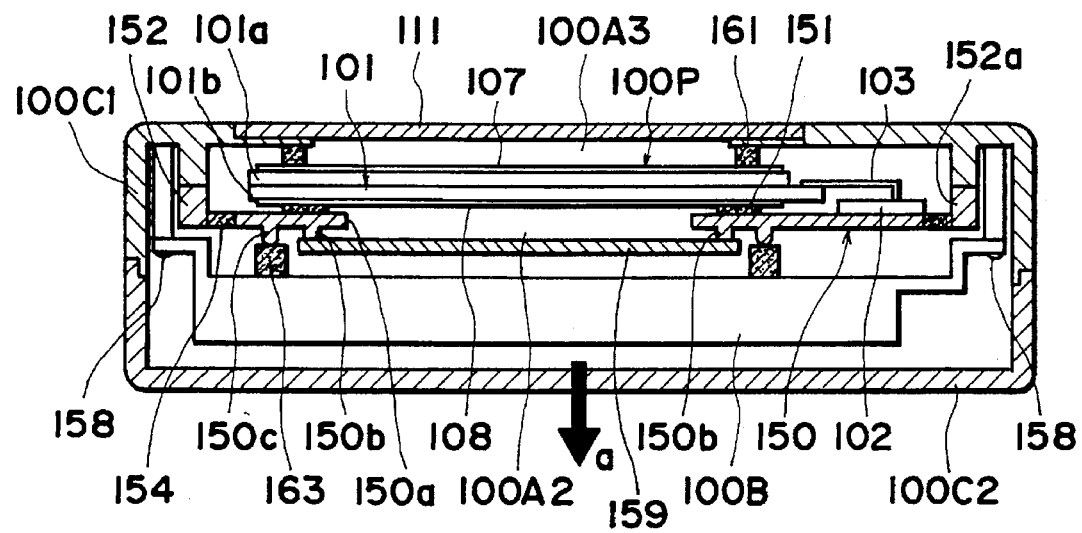
FIG. 12 is a sectional view of a liquid crystal display apparatus according to a first embodiment of the invention.
Figure 13:
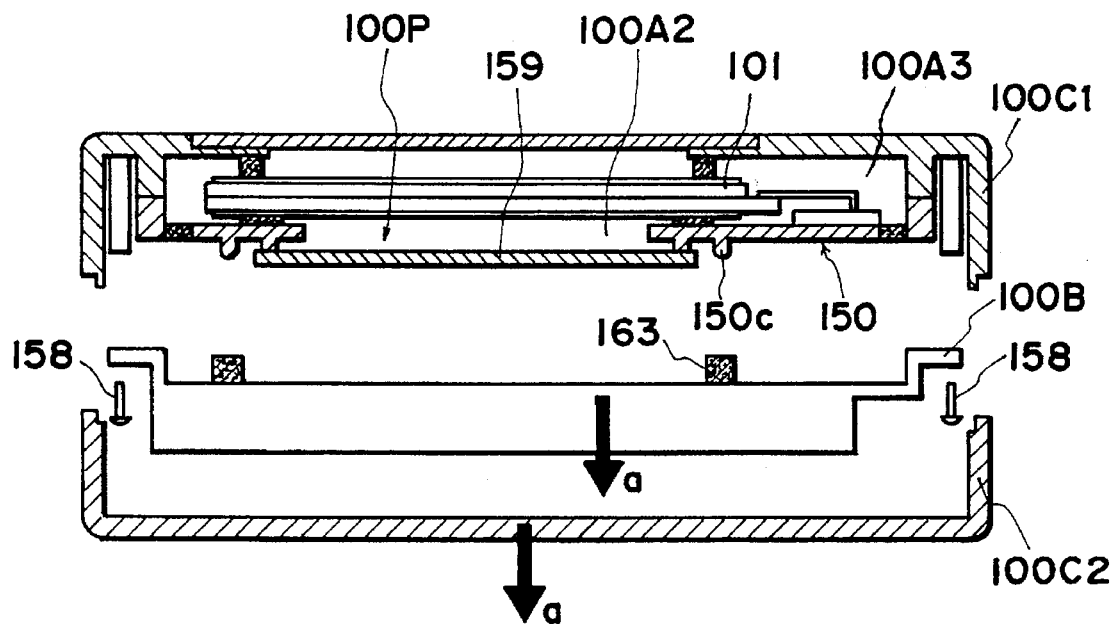
FIG. 13 is a sectional view for illustrating the state of exchanging a backlight device in the liquid crystal display apparatus shown in FIG. 12.

As shown in FIG. 12, a liquid crystal display apparatus according to this embodiment includes a liquid crystal panel unit 100P, a backlight device 100B, and housings 100C1 and 100C2 that house the liquid crystal panel unit 100P and the backlight device 100B, respectively.

Among these, the liquid crystal panel unit 100P comprises a fixing plate 150, a diffusion plate (light-transmissive plate) 159, a liquid crystal panel 101 and a peripheral circuit substrate 102. The fixing plate 150 is provided with an opening 150a. The whole peripheral part surrounding the opening 150a on the lower side of the fixing plate 150 is provided with a rib 150b, to which a diffusion plate 159 is applied to stop the opening 150a. The liquid crystal panel 101 is applied with a rubber-type adhesive 151 applied to the whole periphery surrounding the opening 150a so as to stop the opening 150a. An almost closed space (first space) 100A2 is defined by the fixing plate 150, the diffusion plate 159, the liquid crystal panel 101, etc. A narrow ridge 150C (which will be described in more detail hereinafter) is formed at a part on the lower side of the fixing plate 150 spaced with a prescribed gap from the rib 150b. Onto the upper surface at a part close to an end of the fixing plate 150, a peripheral circuit plate 102 is fixed, e.g., by screwing.

On the other hand, a fixing plate-supporting member 152 is disposed so as to surround the fixing plate 150. The fixing plate-supporting member 152 has a shape of a frame having an opening 152a. The fixing plate-supporting member 152 and the fixing plate 150 are spaced from each other with a certain gap which is filled with an elastic member 154 so that the fixing plate 150 is hanged in space by the fixing plate-supporting member 152 via the elastic member 154. The formation of or the adhesion with the elastic member 154 may be performed by disposing the fixing plate 150 within the opening 152a of the fixing plate-supporting member 152 and filling the gap between the fixing plate 150 and the fixing plate-supporting member 152 with a rubber-type adhesive, followed by curing of the adhesive.

The fixing plate-supporting member 152 is fixed to the upper housing 100C1 of the apparatus, and an opening provided to the upper housing 100C1 is stopped with a protective plate (housing) 111. The protective plate 111 is formed of a glass plate which is transparent and rich in rigidity. An almost closed space (second space) 100A3 is defined by the apparatus upper housing 100C1, the protective plate 111, the fixing plate-supporting member 152, the elastic member 154, and the liquid crystal panel unit 100P. As a result, when the liquid crystal panel unit 100P supported by hanging in space is vibrated on receiving an external impact, the vibration is quickly attenuated due to the air damper effect of the space 100A3 so that the impact transmitted to the liquid crystal panel 101 is alleviated.

On the lower surface of the upper housing 100C1, an elastic member (sponge) 161 in the form of a frame is applied along the whole periphery surrounding the opening of the upper housing 100C1 to further partition the almost closed space 100A3, thereby preventing intrusion of dust onto the surface of the liquid crystal panel 101. The sponge 161 is elastomeric, so that it can absorb the vibration of the liquid crystal panel 101.

Below the liquid crystal panel unit 100P, a backlight device 100B is disposed by affixation to the upper housing 100C1 with screws 158. To the upper housing 100C1, the apparatus lower housing 100C2 is detachably affixed so as to protect the backlight device 100B within the housings 100C1 and 100C2. In this embodiment, the backlight device 100B can be exchanged by taking apart the lower housing 100C1 and the screws 158 (FIG. 13). At a spacing between the backlight device 100B and the lower housing 100C2, a panel control plate (not shown) is disposed so as to transform signals from a computer (not shown) into a form suitable for driving the liquid crystal panel and controlling the liquid crystal display panel.

A frame-shaped sponge 163 is applied to the backlight device 100B so as to abut to the ridge 150C, thereby further partitioning the almost closed space 100A2 to prevent the intrusion of dust onto the luminescent surface of the backlight device 100B and the lower surface of the diffusion plate 159. The sponge 163 is elastomeric and functions to absorb the vibration of the liquid crystal panel 101.

The following advantageous effects may be given by this embodiment.

According to this embodiment, when it becomes necessary to exchange the backlight device 100B due to shortening of the life of the lamps accompanying the use of higher luminance lamps, the backlight device 100B can be easily exchanged by removing the lower housing 100C2 and the screws 158. Even during the exchange of the backlight device, the closed state of the spaces 100A2 and 100A3 formed above and below the liquid crystal panel 101 is not impaired, so that the attachment of dust onto the surfaces of the liquid crystal panel 101 (more exactly the surfaces of the polarizers 107 and 108) is prevented to remove the occurrence of display defects. As a result, the wiping for removing the dust is unnecessitated and the exchange operation can be easily performed without using a clean room. At the time of exchanging the backlight, the diffusion plate 159 is exposed so that dust is liable to attach to the lower surface of the diffusion plate 159. The diffusion plate 159 is, however, not affected by a mechanical stress so that the wiping thereof can be easily performed. Further, even if the attached dust is allowed to remain, the dust is hardly recognized due to the diffusion effect of the diffusion plate per se, so that it hardly causes display defects.

On the other hand, as the almost closed space 100A3 is formed above the liquid crystal panel 101, even if the liquid crystal panel is vibrated, the vibration is quickly attenuated by the air damper effect of the space 100A3, thereby preventing the deterioration in display quality.

Further, in this embodiment, the protective plate 111 is formed of a glass plate. The glass plate may have a longitudinal elasticity modulus which is as large as ca. 30 times that of a transparent resin plate (e.g., an acrylic resin plate) and therefore minimize the warping in response to an external stress, such as a static pressure. As a result, even if the space 103A3 causes repetitive expansion and contraction accompanying the vibration of the liquid crystal panel unit 100P, so that the air damper effect of the space 100A3 is better retained and thus the vibration of the liquid crystal panel unit 100P can be attenuated in a short time.

Figure 14:
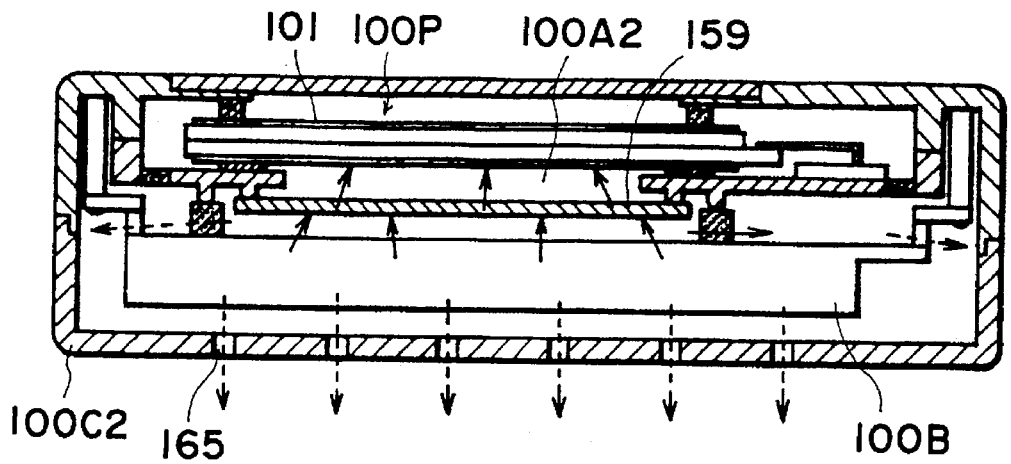
FIG. 14 is a sectional illustration of air flow in case where air-communicating perforations are provided to the apparatus shown in FIG. 12.

Further, as the backlight device 100B is not used to define an almost closed space as in the prior art apparatus, it is possible to form air-communicating perforations 165 in the lower housing 100C2 as shown in FIG. 14, thereby improving the ventilation around the backlight device 100B. As a result, a major part of the heat evolved from the backlight device can be discharged outside through the perforations 165. Further, a part of the heat not discharged through the perforations 165 is interrupted by the diffusion plate between the backlight device 100B and the liquid crystal panel 101. Accordingly, the heat transmitted to the liquid crystal panel 101 due to the convection in the space 100A2 is considerably reduced, and the temperature distribution is uniformized.

Figure 15:
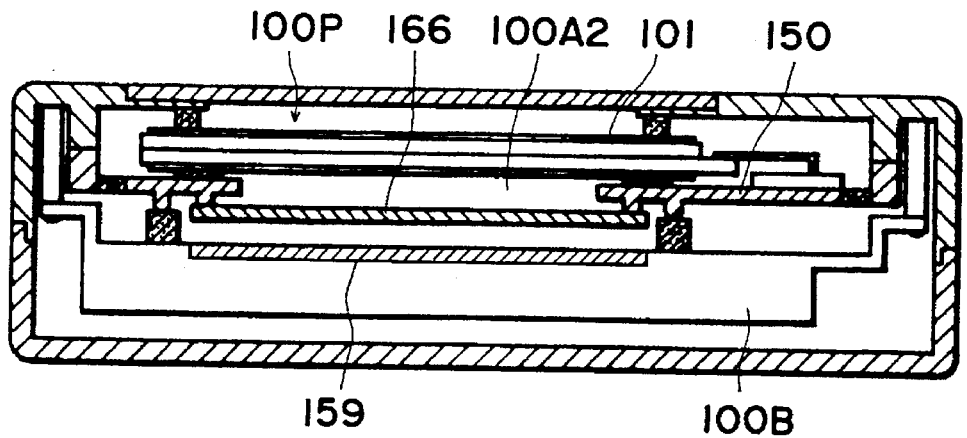
FIG. 15 is a sectional view of another application of liquid crystal display apparatus according to the first embodiment.

In the above embodiment, the diffusion plate 159 is applied to the fixing plate 150 and is used to define the closed space 100A2. This is not necessary, but it is possible to dispose a transparent plate (light-transmissive plate) 166 only for defining the closed space and allow the diffusion plate 159 to be fixed onto the surface of the backlight 100B as shown in FIG. 15. In the above embodiment, the light source in the backlight device is constituted by fluorescent lamps but this is of course not necessary. Other light sources may be used, and the backlight need not be placed right below the liquid crystal panel but can be placed on a side of the liquid crystal panel.

Figure 16:
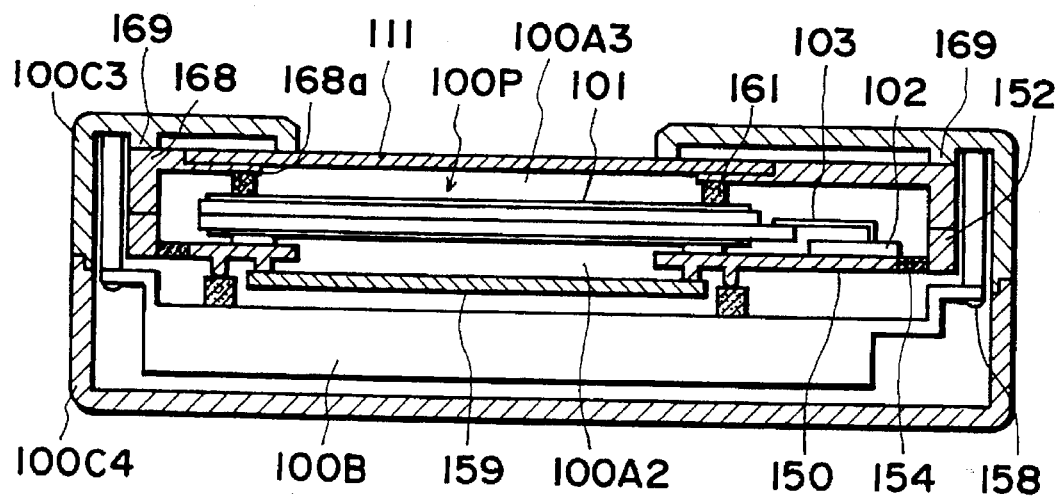
FIG. 16 is a sectional view of a liquid crystal display apparatus according to a second embodiment of the invention.

FIG. 16 shows another embodiment of the present invention.

In this embodiment, a fixing plate-supporting member 152 is affixed to a frame member 168 having a sectional shape close to character "L". The frame member 168 has an opening 168a, that is stopped by a protective plate (housing) 111. The protecting plate 111, the frame member 168, the fixing plate-supporting member 152, an elastic member 154 and a liquid crystal panel unit 100P define an almost closed space (second space) 100A3. On the lower face of the frame member, a sponge 161 is applied along the whole periphery of the opening 168a of the frame member 168 to further partition the almost closed space 100A3, thereby preventing the intrusion of dust onto the surface of the liquid crystal panel 101. The frame member 168 is affixed to an upper housing 100C3, to which a lower housing 100C4 is detachably affixed so as to house the liquid crystal panel unit 100P, etc.

This embodiment provides advantageous effects similar to those attained by the first embodiment described above.

As described above, according to this aspect of the invention, even when it becomes necessary to exchange a backlight due to shortening of the life of lamps accompanying the higher luminance of the lamps, the backlight can be detached while retaining the closed state of the space surrounding the liquid crystal panel. As a result, the wiping for removing the dust is unnecessitated and the exchange operation can be easily performed without using a clean room. At the time of exchanging the backlight, the light-transmissive plate is exposed so that dust is liable to attach to the light-transmissive plate, but the light-transmissive plate is not affected by a mechanical stress, so that the wiping thereof can be easily performed without causing display defects.

Further, in the case of defining an almost closed second space with the liquid crystal panel and a housing, the vibration of the liquid crystal panel is quickly attenuated due to the air damper effect of the second space, whereby the deterioration in display quality of the liquid crystal panel is obviated. In this instance, if a portion of the housing opposing the liquid crystal panel is formed of glass, the glass portion is not readily warped, so that the air damper effect of the second space is better exhibited and the vibration of the liquid crystal panel is more effectively attenuated.

Further, as it is unnecessary to use the backlight for defining a closed space, the ventilation around the backlight can be improved, thereby discharging a major part of the heat generated from the backlight to outside. Further, the light-transmissive plate functions to suppress a heat transfer from the backlight to the liquid crystal panel, so that the heat transfer to the liquid crystal panel is minimized and the temperature distribution is uniformized.

Figure 4:
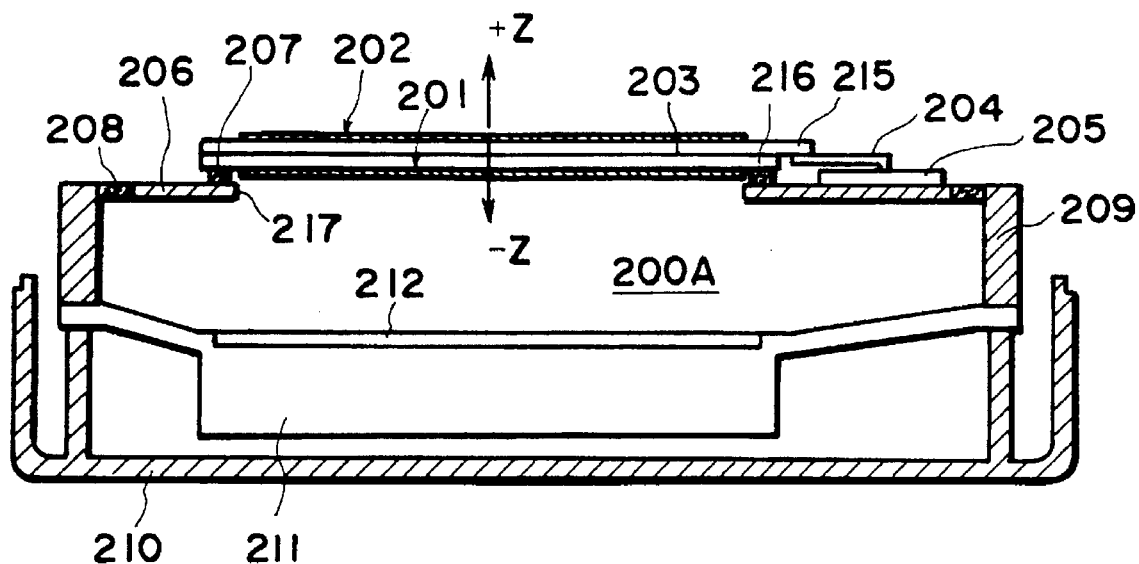
Figure 5:
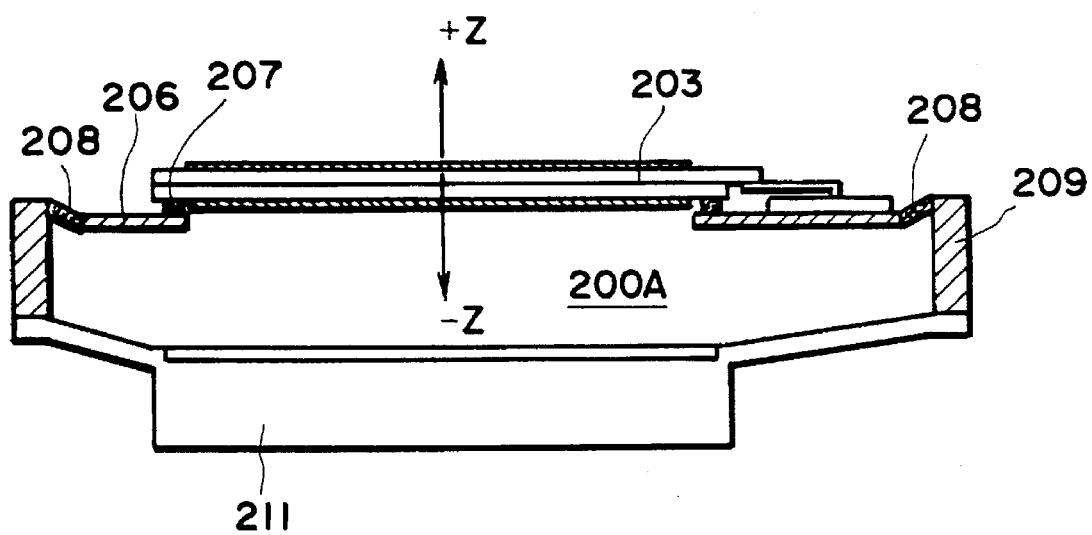
FIG. 5 is a sectional view illustrating the state of a liquid crystal panel having received an external force in the liquid crystal display apparatus shown in FIG. 4.
Figure 6:
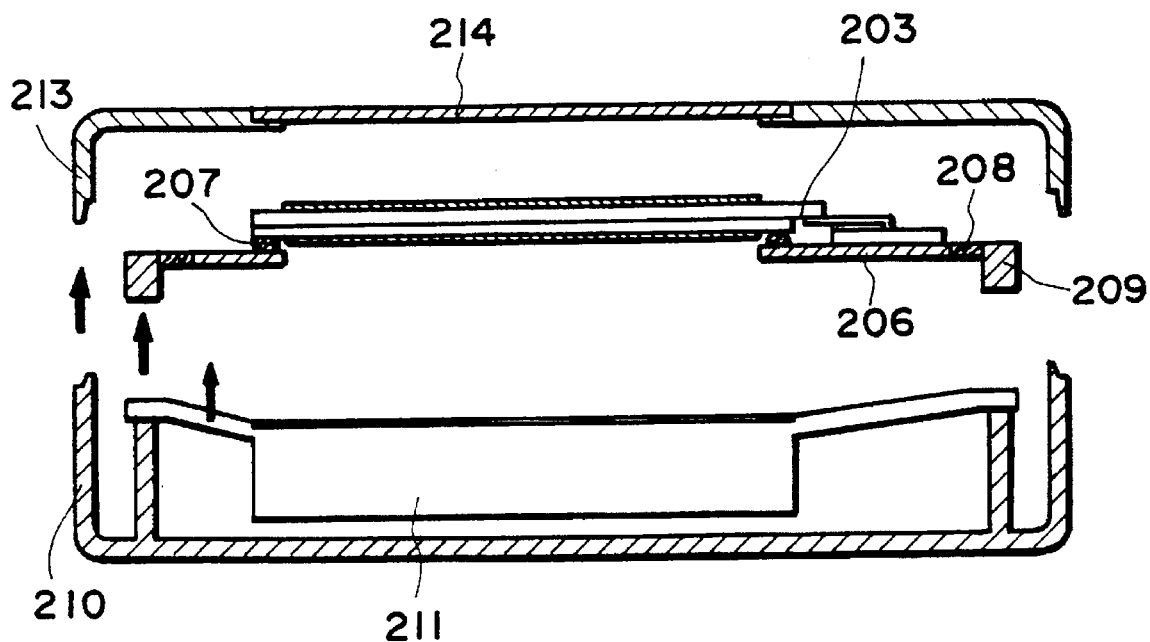
Figure 7:
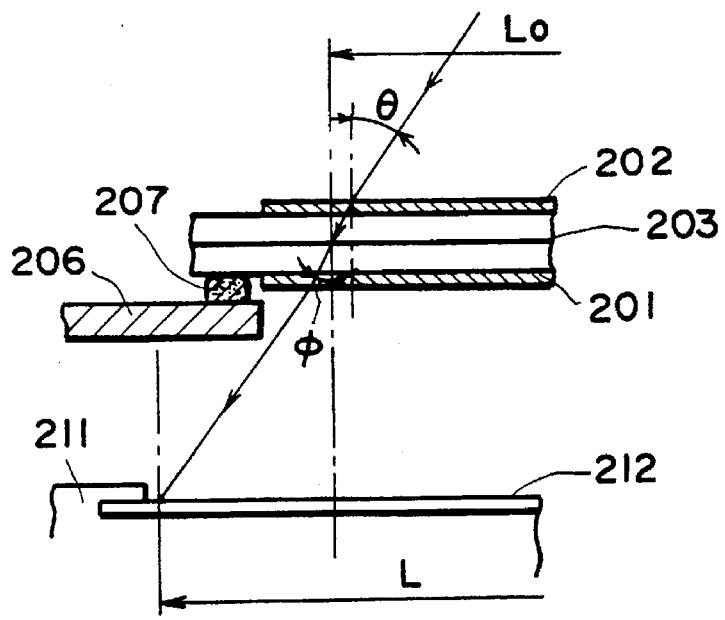
FIG. 7 is an illustration for describing a relationship between a display region of the liquid crystal panel and an effective luminescent region of the backlight unit in the liquid crystal display apparatus shown in FIG. 6.
Figure 8:
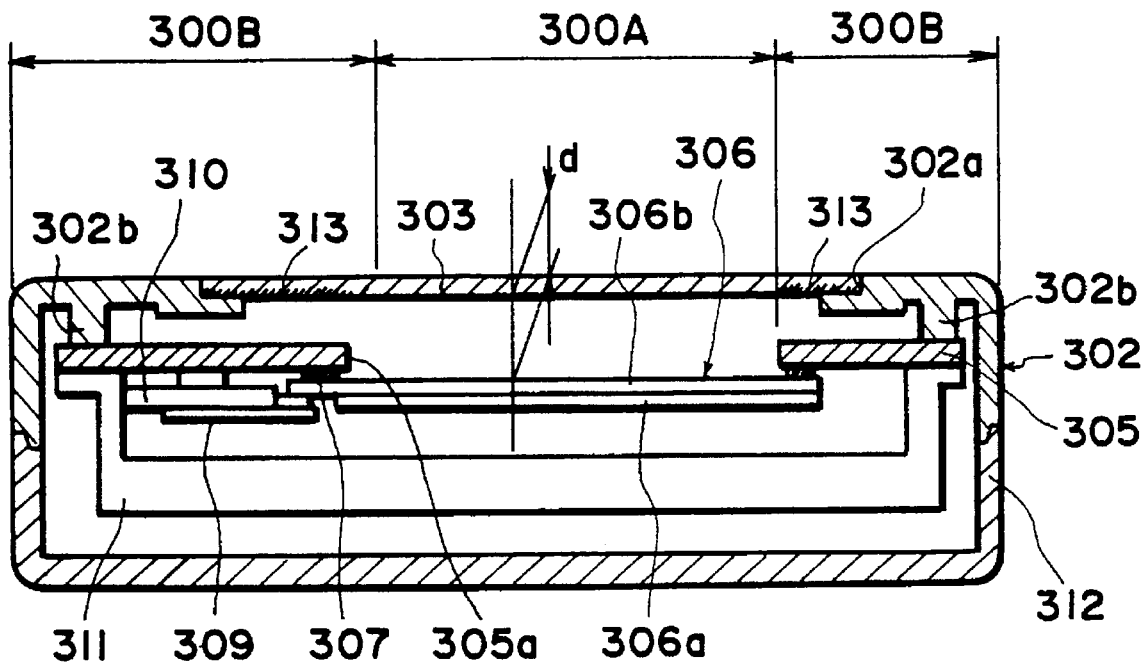

A third embodiment of the present invention will now be described with reference to FIGS. 17 to 20 wherein similar parts as in FIG. 4 are denoted by identical reference numerals and repetitive description will be omitted.

Referring to FIG. 17, in this embodiment, a diffusion plate 212 is fixed onto a lower face of a panel-fixing plate (supporting member) 206 so as to define a closed space 221 in combination with a liquid crystal panel 203 and the panel fixing plate 206. The panel-fixing plate 206 is supported by a fixing plate-supporting member 209 via an elastic member 208, and the fixing plate-supporting member 209 is fixed to an apparatus upper housing 213. The upper housing is provided with an opening at a part corresponding to the liquid crystal panel 203, and the opening is stopped with a display plate 214 for protecting the liquid crystal panel 203. Below the upper housing 213, a backlight unit 211 is affixed by screws 220 so as to cover a lower part of the diffusion plate 212. The backlight unit 211 is composed of a backlight unit-supporting member 225, and a backlight 226 fixed to a lower part of the supporting member 225. The lower housing 210 is detachably affixed to the upper housing 213. The panel fixing plate 206 may be bonded to the fixing plate-supporting member 209 with an elastic member 208 by disposing the panel-fixing plate 206 within an opening 218 of the fixing plate-supporting member 209 and the panel-fixing plate 206 with a rubber-type adhesive, which is then cured. A closed space 219 above the liquid crystal panel 203 is defined by the panel-fixing plate 206, the fixing plate-supporting member 209, the upper housing 213 and the display plate 214, and a closed space 227 below the diffusion plate 212 is defined by the panel-fixing plate 206, the fixing plate-supporting member 209 and the backlight unit 211. The spaces 219 and 227 may have a function of attenuating the vibration of the liquid crystal panel 203, when it is caused together with the vibration of the panel-fixing plate 206, etc., due to the air damper effect. In this embodiment, the backlight unit 211 can be exchanged by detaching the lower housing 210 and the screws 220 (FIG. 18).

According to this embodiment, when it becomes necessary to exchange the backlight unit 211 due to shortening of the life of the lamps accompanying the use of higher luminance lamps, the closed state of the space 221 formed below the liquid crystal panel 203 is not impaired, so that the attachment of dust onto the surface of the liquid crystal panel 203 (more exactly the lower surface of the polarizing film 201) is prevented to remove the occurrence of display defects. As a result, the wiping for removing the dust is unnecessitated and the exchange operation can be easily performed without using a clean room. At the time of exchanging the backlight, the diffusion plate 212 is exposed so that dust is liable to attach to the lower surface of the diffusion plate 212. The attached dust is hardly recognized due to the diffusion effect of the diffusion plate 212 per se, so that it hardly causes display defects.

Figure 19:
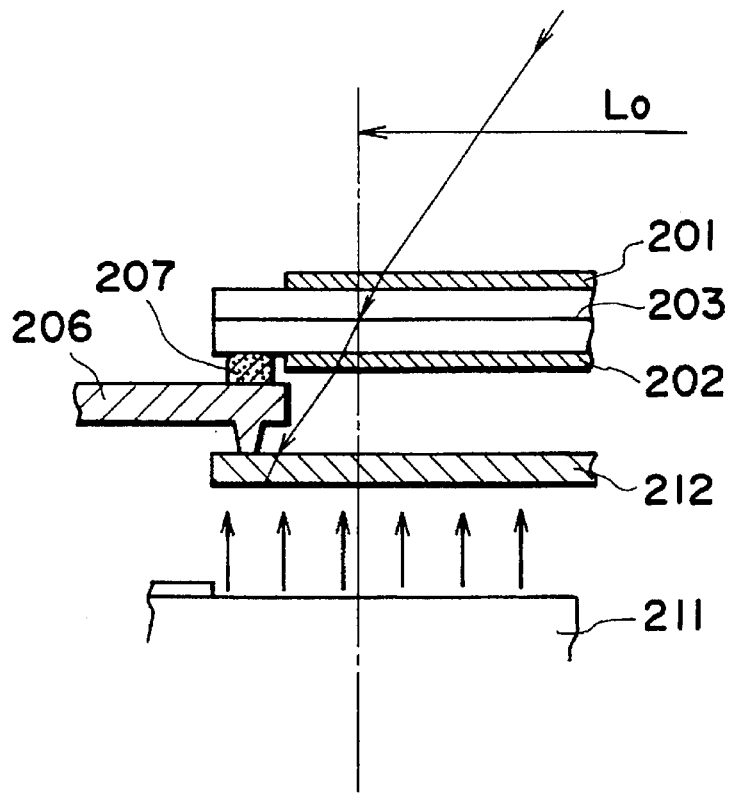
FIG. 19 is an illustration for describing a relationship between a display region of the liquid crystal panel and an effective luminescent region of the backlight unit.

Further, by disposing the diffusion plate 212 just below the liquid crystal panel 203 as described above, it is possible to obtain an effect similar to that obtained by disposing the luminescent face of the backlight unit 211 closer to the liquid crystal panel 203, and it becomes possible to narrow the effective luminescent region $L_0$ of the backlight while retaining a prescribed distance between the liquid crystal panel 203 and the backlight unit 211 (FIG. 19). As a result, the backlight unit 211 can be made smaller in size, and the backlight unit 211 can be reduced in size to make smaller the entire liquid crystal display apparatus.

Figure 20:
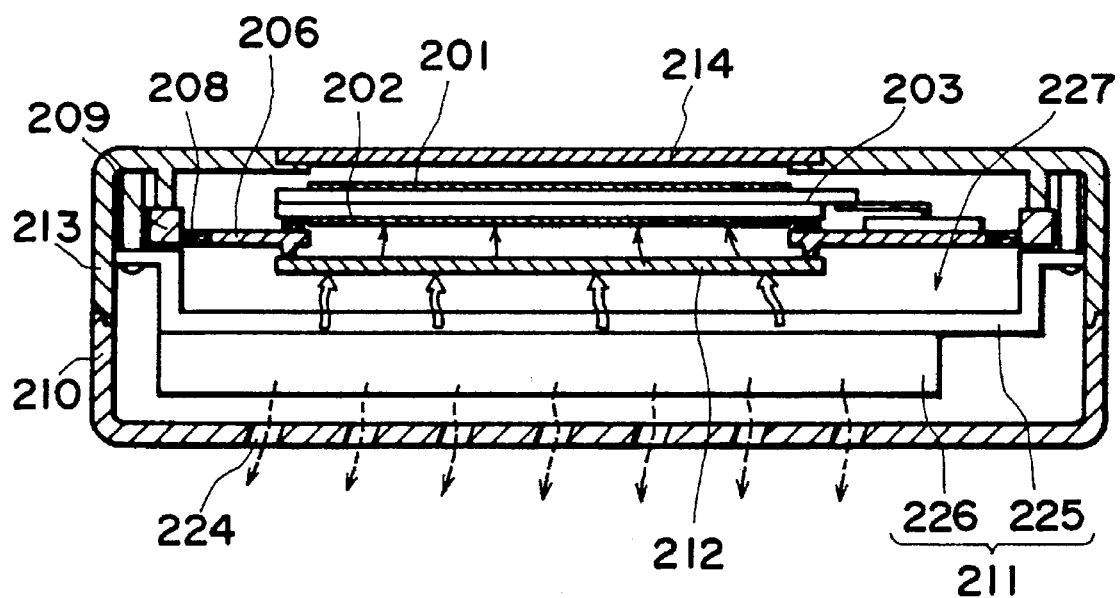
FIG. 20 is a sectional view for illustrating the state of a thermal flow from the backlight unit.

Further, as the backlight unit 211 is not used to define an almost closed space as in the prior art apparatus, it is possible to form air-communicating perforations 224, as shown in FIG. 20 thereby improving the ventilation around the backlight unit 211. As a result, a major part of the heat evolved from the backlight unit 211 can be discharged outside through the perforations 224. Further, a part of the heat not discharged through the perforations 224 is interrupted by the diffusion plate 212 between the backlight unit 211 and the liquid crystal panel 203. Accordingly, the heat transmitted to the liquid crystal panel 203 due to the convection in the space 212 is considerably reduced, and the temperature distribution is uniformized.

Figure 21:
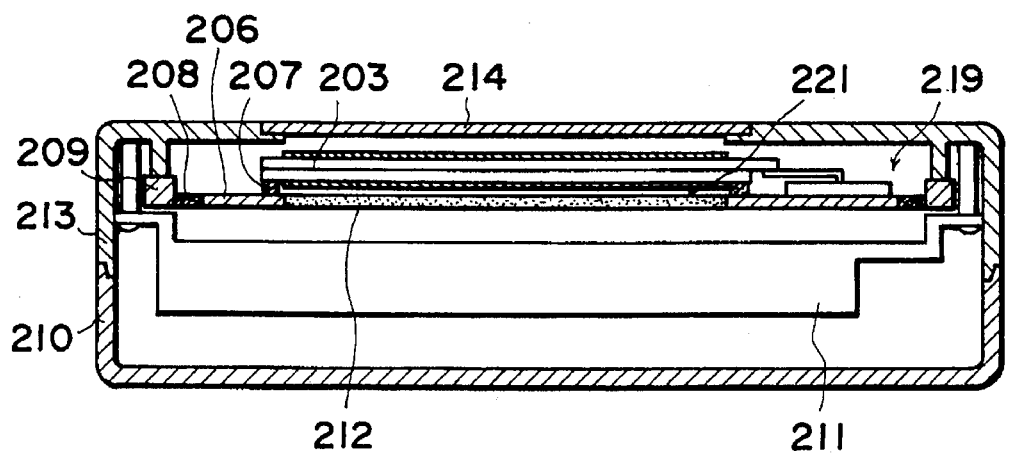
FIGS. 21–23 are sectional views each showing a liquid crystal display apparatus according to a further embodiment of the invention.

In the above embodiment, the diffusion plate 212 is applied to the lower side of the panel fixing plate 206. This is not necessary, and it is also possible to dispose the diffusion plate 212 within an opening of the panel-fixing plate 206 as shown in FIG. 21.

Figure 22:
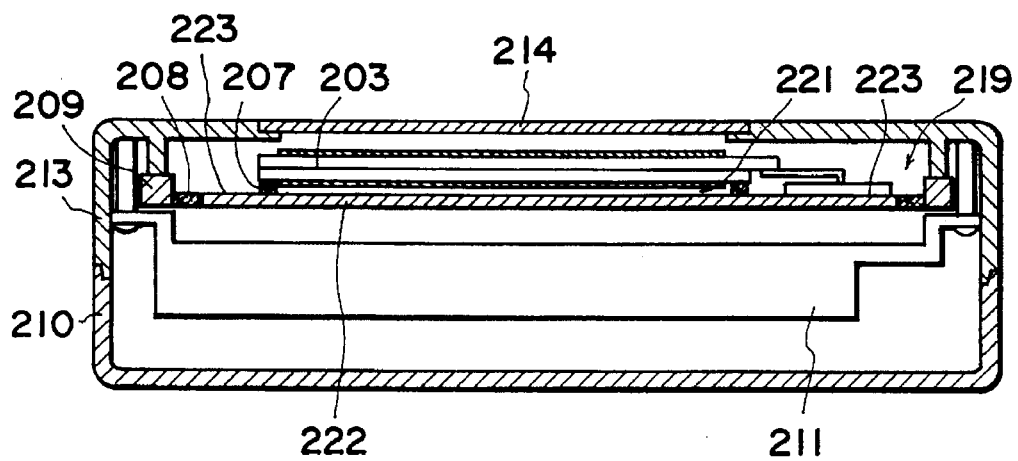

FIG. 22 shows another embodiment of the present invention.

In this embodiment, a panel-fixing plate 222 is used in place of the panel-fixing plate 206 and the diffusion plate 212 in the above embodiment. The panel-fixing plate 222 comprises a material which is light-transmissive and has a light-diffusing effect, and the liquid crystal panel 203 is affixed thereto via an adhesive 207. A closed space 221 is defined between the liquid crystal panel 203 and the panel-fixing plate 222, and an end of the panel-fixing plate 222 is affixed to the fixing plate-supporting member 209 via an elastic member 208. At the periphery of the panel-fixing plate 222, a light-interrupting mask 223 is affixed for demarcation.

In this embodiment, similar effects as in the above embodiment can be attained. More specifically, the attachment of dust onto the liquid crystal panel 203 can be prevented even during the exchange of the backlight unit 211, and the backlight unit 211 can be reduced in size.

As described above, in this aspect of the present invention, a diffusion plate disposed in the vicinity of a liquid crystal panel is used to define a closed space together with the liquid crystal panel, and the closed state of the space is retained even during the exchange of a backlight. As a result, dust attachment onto the liquid crystal panel surface can be obviated, and the wiping operation for removal of the dust is unnecessitated. Further, no liability of display defects due to dust attachment is involved, and the backlight can be exchanged easily without using a clean room. At the time of exchanging the backlight, the diffusion plate is exposed so that dust is liable to attach to the surface thereof but the dust is not readily recognizable because of light-diffusion by the diffusion plate, thus being unlikely to cause display defects.

The disposition of a diffusion plate close to the liquid crystal panel has an effect similar to that obtained by disposing the backlight closer to the liquid crystal panel, so that it becomes possible to reduce the effective luminescent region of the backlight while retaining a prescribed spacing between the liquid crystal panel and the backlight. As a result, the backlight can be reduced in size, and the entire liquid crystal display apparatus can be made smaller.

Further, as the backlight need not be used to define a closed space, the ventilation around the backlight can be improved by forming perforations in the housing, so that a major part of the heat evolved from the backlight can be discharged outside through the perforations. Further, a part of the heat not discharged through the perforations can be interrupted by the diffusion plate disposed between the backlight and the liquid crystal panel. As a result, the heat transferred to the liquid crystal panel due to convection within the closed space can be considerably reduced, and the temperature distribution is uniformized.

Figure 9:
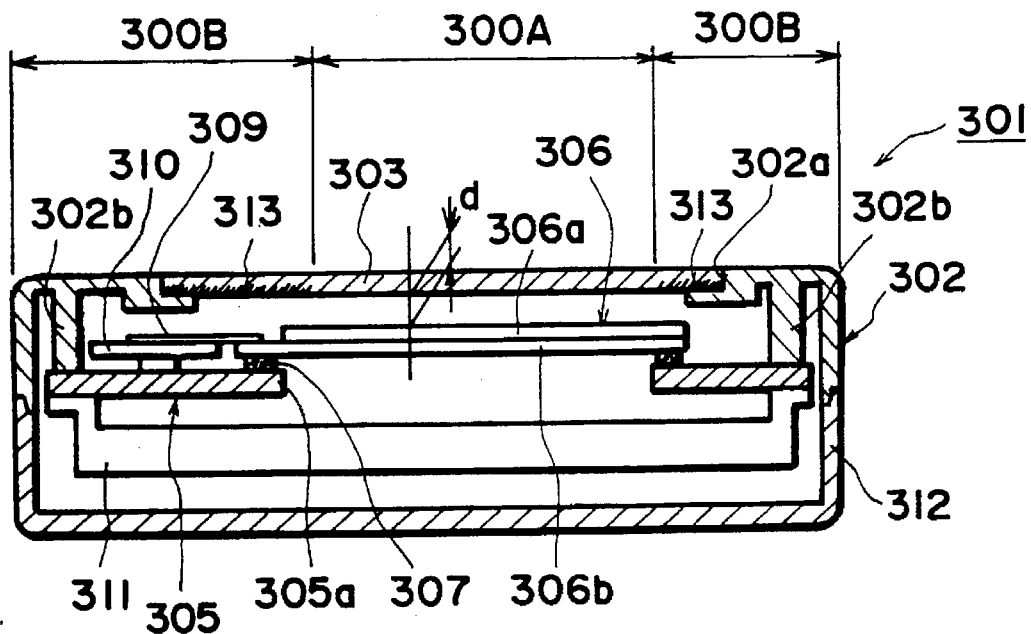
FIG. 9 is a sectional view of another known liquid crystal display apparatus.
Figure 10:
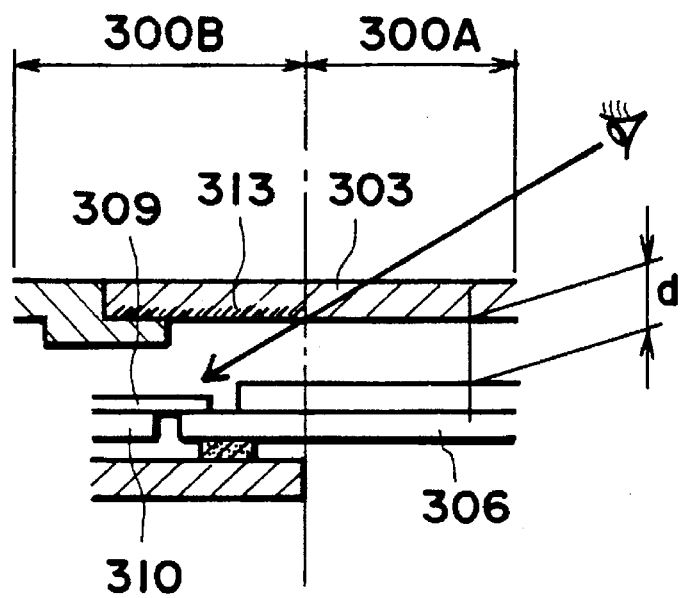
FIG. 10 is a partial enlarged view for illustrating a problem of the apparatus shown in FIG. 9.

A further embodiment of the present invention will now be described with reference to FIG. 23 wherein similar parts as in FIG. 9 are denoted by identical reference numerals and repetitive description will be omitted.

Figure 23:
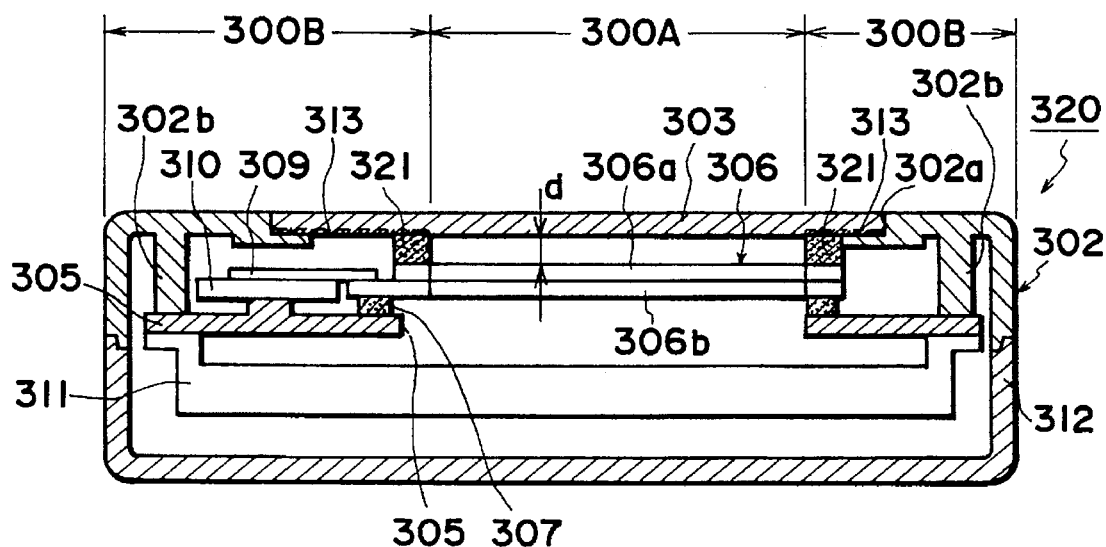

Referring to FIG. 23, in a liquid crystal display apparatus 320 according to this embodiment, an elastic member 321 of, e.g., polyester-polyurethane foa (e.g., "MOLTOPREN" (trade name), available from INOAC corp.) is disposed at the innermost position in a non-display region 300B of a liquid crystal panel 306 between the liquid crystal panel 306 and a display plate 303 (transparent portion of a housing 302). The elastic member 321 is in the form of a frame surrounding a display region 300A and is composed of a light-nontransmissive material so that the interior of the liquid crystal display apparatus 320 cannot be observed. The elastic member 321 is held by being sandwiched between the liquid crystal panel 306 and the display plate 303, and the upper face thereof contacts a printed portion 313.

In this embodiment, as the light-nontransmissive member 321 is disposed at a gap between the liquid crystal panel 306 and the display plate 303, the members inside the display apparatus, such as a TAB film 309, cannot be recognized from outside. Further, the deformation of the display plate 303 is suppressed by the member 321 to keep constant the gap between the liquid crystal panel 306 and the display plate 303. Further, as the member 321 is an elastic member, even if an external force is applied to the display plate, the external force is attenuated by the member 321.

The following advantageous effects can be attained by this embodiment.

In this embodiment, the members such as the TAB film 309 are hidden by the elastic member 321 and not recognized from outside, so that the appearance of the liquid crystal display apparatus 320 can be improved. Further, even if an external force is applied to the display plate 303, the deformation of the display plate 303 is regulated by the elastic member 321, so that a possible damage of the liquid crystal panel 306 due to contact with the display plate 303 can be prevented. Accordingly, it is not required to compose the display state 303 of a material having an unnecessarily high rigidity in order to prevent the deformation of the display plate 303 and it is possible to obviate the increase in cost or weight. Further, as the light-interrupting member is composed of not a rigid material but an elastic material, a vibration or impact applied to the display plate can be attenuated. Further, even if a vibration or impact is transmitted to the liquid crystal panel 306 via a fixing member 305, the vibration etc. can be quickly attenuated by the elastic member 321 so as to minimize the display quality deterioration of the liquid crystal panel.

In the above embodiment, the elastic member 321 is sandwiched between the liquid crystal panel 306 and the display plate 303. The elastic member 321 can be, however, bonded to the liquid crystal panel 306 or to the display plate 303.

In the above embodiment, the upper face of the elastic member 321 is caused to contact the display plate 303 for the purpose of, e.g., suppressing the deformation of the display plate 303. However, if the housing 302 has an opening 302a having an area substantially equal to that of the display region 300A, the upper face of the elastic member 321 can directly contact the housing 302 instead of the display plate 303.

Figure 24:
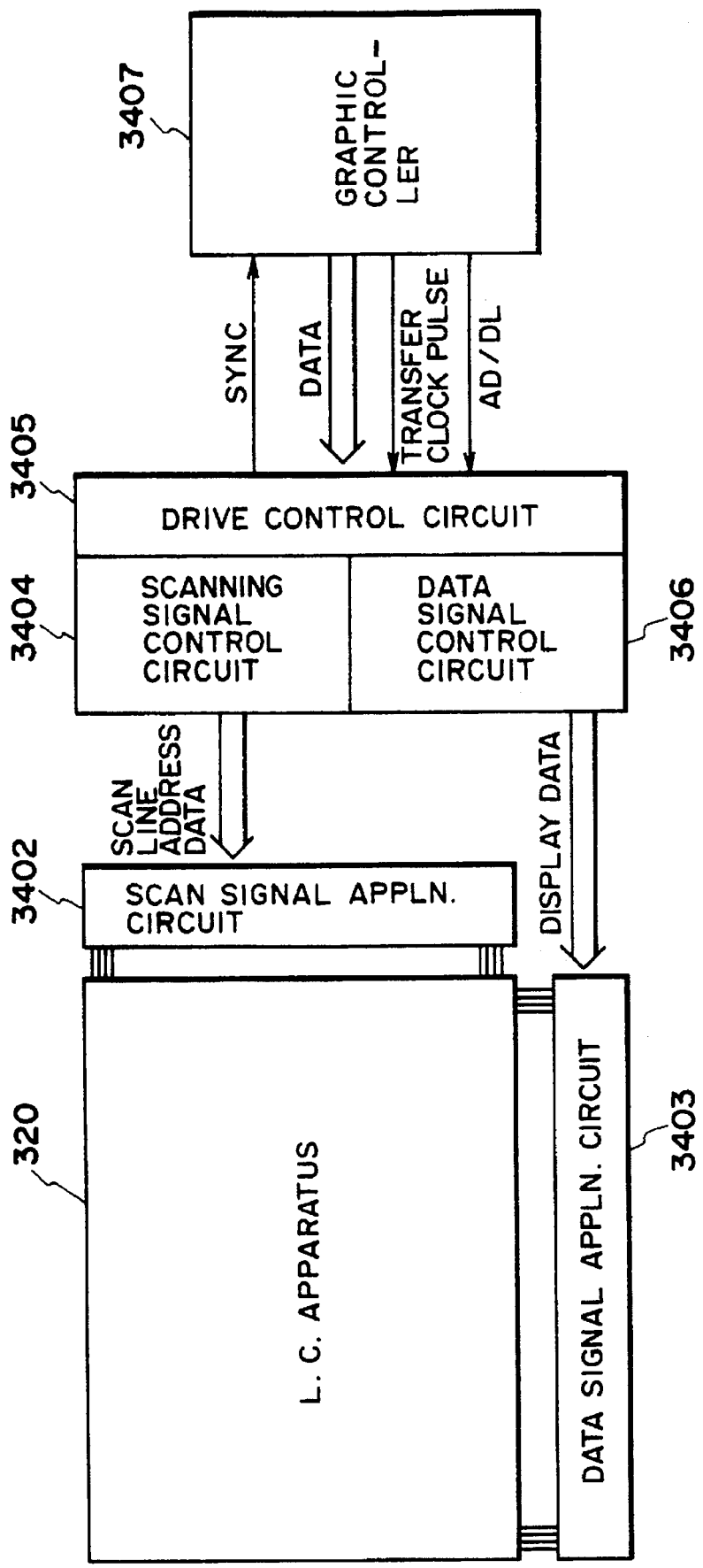
FIG. 24 is a circuit block diagram of a display apparatus applicable to the invention.

Surrounding appliances of the above-described liquid crystal display apparatus 320 will now be briefly described with reference to FIG. 24, which is however also applicable to the other embodiments of the liquid crystal display apparatus.

The liquid crystal display apparatus 320 according to this embodiment may be connected to a scan signal application circuit 3402 and a data signal application circuit 3403, which are further sequentially connected to a scan signal control circuit 3404 and a data signal control circuit 3406, respectively, then to a drive control circuit 3405 and a graphic controller 3407, so that data and a scan scheme signal are respectively supplied from the graphic controller 3407 to the scan signal control circuit 3402 and the data signal control circuit 3403 via the drive control circuit 3405. The data is converted into address data and display data by the circuits 3403 and 3406, respectively. On the other hand, the scanning scheme signal is supplied, as it is, to the scan signal application circuit 3402 and the data signal application circuit 3403. Further, the scan signal application circuit 3402 supplies a scan signal having a waveform determined by the scan scheme signal to a scan electrode determined by the address data. The data signal application circuit 3403 supplies data signals determined by both of the display data determining a white or dark display state and the scan scheme signal.

As described above, according to the third aspect of the present invention, the interior (non-display region) of the liquid crystal display apparatus is prevented from observation so that the appearance of the liquid crystal display apparatus can be improved. Further, even if an external force is applied to the housing, particularly a transparent portion thereof, the deformation thereof is suppressed by the elastic member so that the liquid crystal panel is prevented from being damaged by contact. Accordingly, it is not required to use a material having an unnecessarily rigid material for preventing the deformation thereof so that it is possible to obviate the increase in cost and weight of the liquid crystal display apparatus. Further, the light-interrupting member is an elastic member and not a rigid member, a vibration or impact applied to the housing can be attenuated thereby. Further, even if the liquid crystal panel is vibrated for some reason, the vibration can be quickly attenuated by the elastic member, so that the deterioration in display image quality of the liquid crystal panel is minimized.

Figure 11:
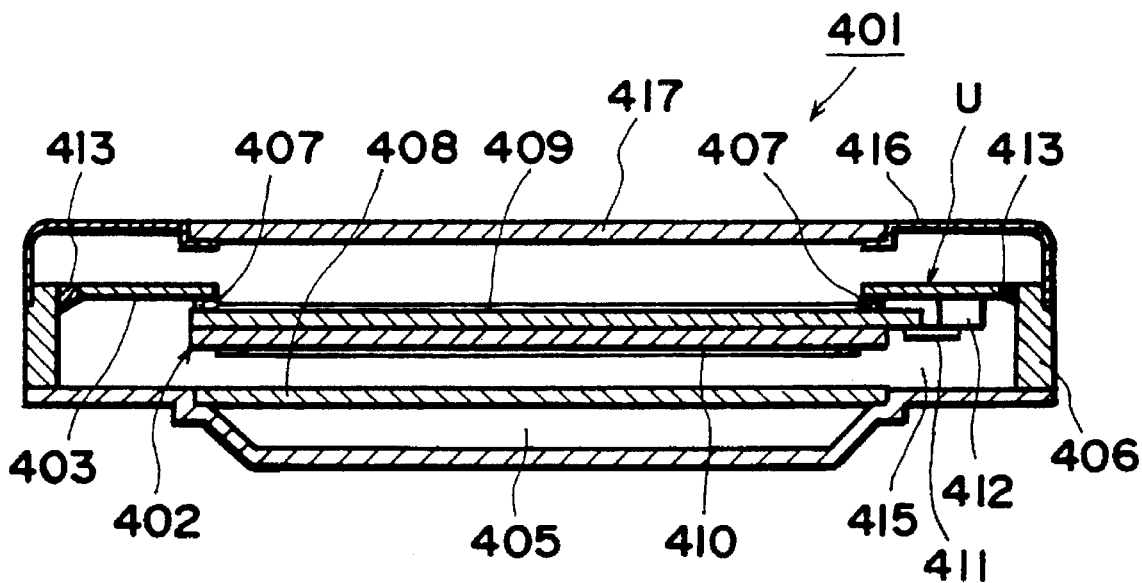
FIG. 11 is a sectional view of another known liquid crystal display apparatus.

A further embodiment of the present invention will be described with reference to FIGS. 25A and 25B wherein similar parts as in FIG. 11 are denoted by identical reference numerals and repetitive description will be omitted.

Figure 25A:
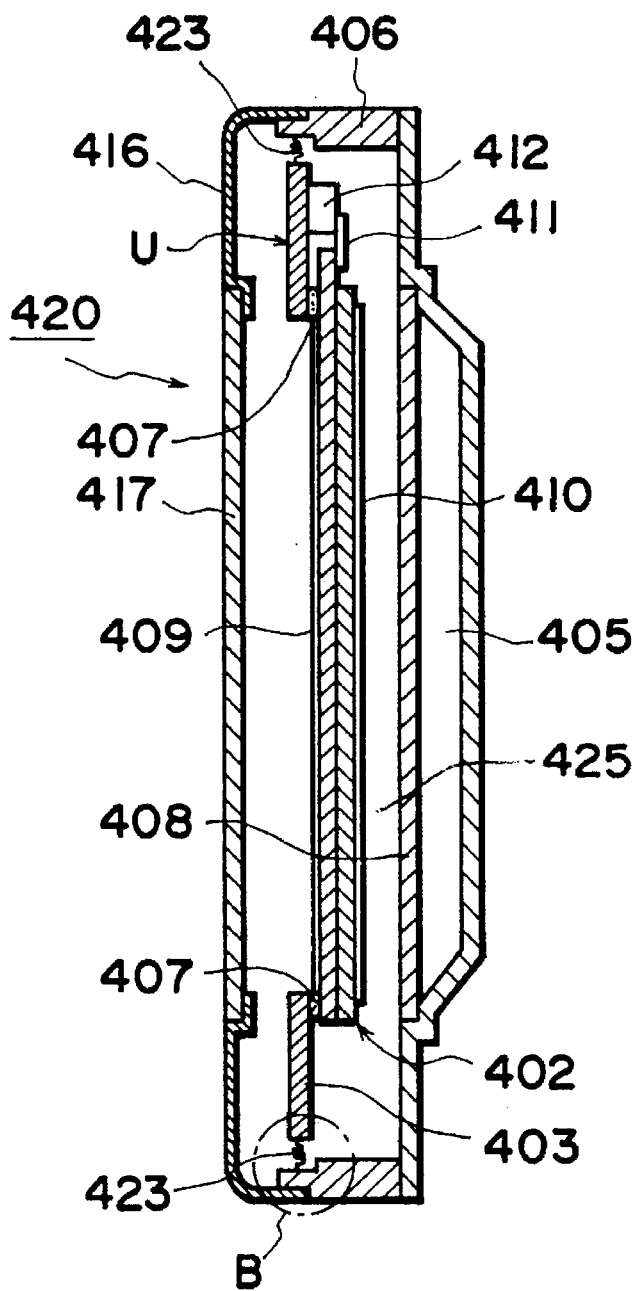
FIG. 25A is a sectional view of a liquid crystal display apparatus according to still another embodiment of the invention.
Figure 25B:
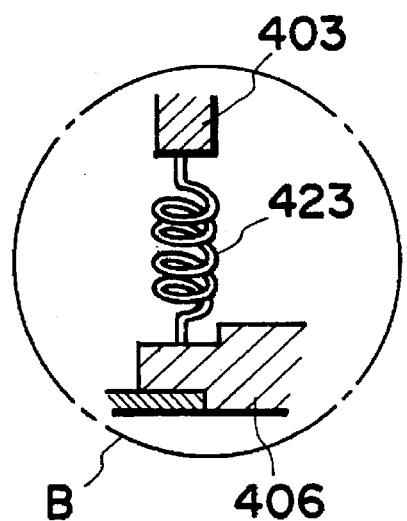
FIG. 25B is an enlarged view of a part of the apparatus shown in FIG. 25A.

Referring to FIGS. 25A and 25B, in a liquid crystal display apparatus 420 according to this embodiment, a plurality of coil-shaped springs 423 are disposed between a fixing frame 406 and a fixing plate (cell-supporting member) 403, and a display unit 400U is supported by the coil springs 423 in the form of being hanged in space. The coil springs 423 do not stop the gap between the fixing frame 406 and the fixing plate 403, so that a space 425 defined by a panel or cell 402, a backlight 405, etc., is not a closed one.

Each coil spring 423 may comprise a material selected from metals, resins and composite materials of a metal and a resin. The springs 423 may preferably be disposed in a plurality for each of the four sides of the fixing plate 403, i.e., the four sides of the display panel 402.

In this embodiment, as the coil springs 423 showing an elasticity are disposed between the fixing frame 406 and the fixing plate 403, and a rubber-type adhesive 407 also showing an elasticity is also disposed between the fixing plate 403 and the panel 402, so that an external impact or vibration is attenuated by the coil springs 423 and the adhesive 407 and is not readily transmitted to the panel 402.

The display unit 400U is supported by the coil springs 423, which do not cause a substantial decrease in elasticity even in a long term of use and can thus retain the vibration attenuation effect to suppress the occurrence of alignment defects in the panel 402. This effect is particularly advantageous if the panel is as large as having a diagonal size in excess of 20 inches. Further, similar effects can be attained even in case where the panel 402 is used in an upright position as shown in FIG. 25A and 25B and the whole weight of the display unit 400U is not distributed to all the coil springs 423 but a specific part thereof (i.e., those springs disposed below the panel 402 and the fixing plate 403). Further, in case where the panel 402 is used in an upright position as shown, the coil springs can be disposed only on the upper and lower sides, so that the number thereof can be reduced and the production can be simplified.

Further, as the coil springs 423 do not stop the gap between the fixing frame 406 and the fixing plate 403, the space 425 defined by the panel 402, the backlight 405, etc. is not a closed one. Accordingly, the convection of air surrounding the panel 402 is not hindered and the temperature increase of the panel 402, etc., can be suppressed in spite of heat evolution from the panel 402 and the backlight 405, so that the deterioration in display quality can be suppressed. Further, as the air in the vicinity of the panel need not be packed or closed, the liquid crystal display apparatus can be simplified in structure and produced at a lower cost.

We conducted some experiments for confirming the heat dischargeability and impact resistance of a liquid crystal display apparatus. More specifically, a panel 402 containing a phenylpyrimidine-based ferroelectric liquid crystal and having a diagonal size of 21 inches, was driven under application of a constant voltage (Vop=±25 volts and a pulse width of 51.2 dsec) for switching between white and black states in a specified environment of 25° C. and the temperature at an upper part of the panel 402 was measured to obtain an increased temperature value. On the other hand, an identical liquid crystal display panel disposed in an upright position as shown in FIG. 25A was vertically dropped to measure the maximum impact-resistance value of gravitational acceleration above which the panel caused an alignment deterioration while gradually increasing the gravitational acceleration at an increment of 5 G.

The above experiments were repeated for Example apparatus as shown in FIGS. 25A and 25B wherein the display units were supported by coil springs, and Comparative Example of prior art apparatus wherein the display units were supported by rubber-type adhesive members.

The results are shown in Table 1 below.

TABLE 1

|  | Increased temp. at the top part | Minimum gravitational acceleration causing alignment failure |
| --- | --- | --- |
| Example 1 | 19.5° C. | 80 G |
| Comp. Example 1 | 25.5° C. | 60 G |

As is clear from the above results, the Example apparatus showed a suppressed temperature increase of 19.5° C. (smaller by 6° C. compared with a conventional apparatus) and an increased impact resistance of 80 G (increased by 20 G compared with the conventional apparatus).

The display unit is supported by coil springs 423 in the above embodiment but can be supported by other shapes of springs which may for example comprise metallic or plastic bars shaped into hairpins, or metallic or plastic plates shaped into the shape of character of "U" or hairpin.

The rubber-type adhesive 407 is used to attenuate the vibration and also to bond the panel 402 to the fixing plate 403 in the above embodiment, but other elastic members, like springs, can also be disposed between the panel 402 and the fixing plate 403 so as to attenuate the vibration. In such case of using elastic members for the vibration attenuation, the elastic members may be bonded to the panel 402 and to the fixing plate 403 by using, e.g., a non-elastic adhesive.

As described above, in the fourth aspect of the present invention, the panel and the panel-supporting member are supported in the form of being hanged by spring members disposed between a fixing frame and the panel-supporting member, so that an external impact or vibration is attenuated by the spring members and the transmission thereof to the panel is suppressed. As a result, it is possible to realize a display apparatus having a larger cushioning effect in response to a mechanical stress such as vibration or impact, thereby suppressing the occurrence of alignment defects.

The spring members do not cause a substantial decrease in elasticity even in a long term of use but retain a lasting effect of attenuating the vibration, so that the occurrence of alignment defects in the liquid crystal panel can be suppressed. This effect is particularly pronounced in a large-sized panel having a diagonal size exceeding 20 inches and for a panel used in an upright position wherein the entire weight of the panel, etc., is not uniformly dispersed but is concentrated at a specific part (i.e., the part below the panel etc.).

Further, as the spring members disposed between the fixing frame and the panel-supporting member do not stop the gap therebetween. Accordingly, air surrounding the panel can cause convection while passing through the gap, thereby suppressing the temperature increase of the panel regardless of heat evolution from the panel and the backlight to avoid deterioration of display quality. Further, as air surrounding the panel is not sealed airtight, the liquid crystal display apparatus can be made simpler in structure and produced at a lower cost.

What is claimed is:

1. A liquid crystal display apparatus, comprising:
    a liquid crystal panel comprising a liquid crystal disposed between a pair of substrates each provided with electrodes,
    a backlight for illuminating the liquid crystal panel,
    a diffusion plate disposed between the backlight and the liquid crystal panel for diffusing light from the backlight, and
    a housing bearing a supporting member via an interposed elastic member, said supporting member having an opening and supporting the liquid crystal panel, the backlight and the diffusion plate,
    the liquid crystal panel being affixed to the supporting member so as to cover one side of the opening and the diffusion plate being affixed to the supporting member so as to cover another side of the opening, and
    wherein the diffusion plate is disposed in the vicinity of the liquid crystal panel so as to define an almost closed space in combination with the supporting member and the liquid crystal panel.

2. An apparatus according to claim 1, wherein a part of the housing opposing the liquid crystal panel is formed of glass.

3. An apparatus according to claim 1, wherein the liquid crystal is a ferroelectric liquid crystal.

4. A display apparatus, comprising:

a display panel for displaying images, a housing for supporting the display panel, a light-transmissive protective plate disposed on a display surface side of the display panel and attached to the housing;

a light source disposed on a back side of the display panel, and a light transmission plate disposed between the display panel and the light source, so as to define a first almost closed space between the display panel and the light-transmission plate, wherein the display panel, the light transmission plate and the protective plate are attached to the housing to form an assembled unit containing said first almost closed space, so as to allow detachment of the light source from the assembled unit while retaining said almost closed space, wherein a non-transmissive elastic member is disposed between the light-transmissive protective plate and the display panel so as to surround a display area of the display panel.

5. A display apparatus according to claim 4, wherein said display panel is attached to a panel-supporting member, and the panel supporting member is attached to the housing via an elastic member.

6. A display apparatus according to claim 5, wherein a circuit board comprising means for driving the display panel and a circuit film connecting the circuit board and the display panel are disposed on the panel-supporting member.

7. A display apparatus according to claim 5, wherein the light transmission plate is attached to the panel-supporting member.

8. A display apparatus according to claim 5, wherein the light source is attached to the housing.

9. A display apparatus, comprising:

a display panel for displaying images, a housing for supporting the display panels, a light-transmissive protective plate disposed on a display surface side of the display panel and attached to the housing;

a light source disposed on a back side of the display panel, and a light transmission plate disposed between the display panel and the light source, so as to define a first almost closed space between the display panel and the light-transmission plate, wherein the display panel, the light transmission plate and the protective plate are attached to the housing to form an assembled unit containing said first almost closed space, so as to allow detachment of the light source from the assembled unit while retaining said almost closed space;

wherein said display panel is attached to a panel-supporting member, and the panel supporting member is attached to the housing via a first elastic member;

wherein said light source is attached to the housing so as to contact the light transmission plate via a second elastic member.

10. A display apparatus, comprising:

a display panel for displaying images, a housing for supporting the display panel, a light-transmissive protective plate disposed on a display surface side of the display panel and attached to the housing;

a light source disposed on a back side of the display panel, and a light transmission plate disposed between the display panel and the light source, so as to define a first almost closed space between the display panel and the light transmission plate, wherein the display panel, the light transmission plate and the protective plate are attached to the housing to form an assembled unit containing said first almost closed space, so as to allow detachment of the light source from the assembled unit while retaining said almost closed space, wherein said display panel is attached to a panel-supporting member, and the panel supporting member is attached to the housing via a first elastic member, wherein said light source is backed with a housing provided with air-communicating perforations.

11. A display apparatus, comprising:

a display panel for displaying images, a housing for supporting the display panel, a panel-supporting member to which the display panel and a drive circuit board comprising means for driving the display panel are attached, an elastic member for attaching the panel-supporting member to the housing, a light-transmissive protective plate disposed on a display surface side of the display panel and attached to the housing, a light source disposed on a back side of the display panel, and a light transmission plate disposed between the display panel and the light source, so as to define an almost closed space between the display panel and the light transmission plate, wherein the display panel, the light transmission plate and the protective plate are attached to the housing to form an assembled unit containing said almost closed space, so as to allow detachment of the light source from the assembled unit retaining said almost closed space, wherein a second elastic member is disposed between the light-transmissive protective plate and the display panel so as to surround a display area of the display panel.

12. A display apparatus, comprising:

a display panel for displaying images, a housing for supporting the display panel, a panel-supporting member to which the display panel and a drive circuit board comprising means for driving the display panel are attached, an elastic member for attaching the panel-supporting member to the housing, a light-transmissive protective plate disposed on a display surface side of the display panel and attached to the housing, a light source disposed on a back side of the display panel, a light transmission plate disposed between the display panel and the light source, so as to define a first almost closed space between the display panel and the light transmission plate, and a second almost closed space defined by the display panel, the protective plate and the panel-supporting member, wherein the display panel, the light-transmission plate and the protective plate are attached to the housing to form an assembled unit containing said first almost closed space, so as to allow detachment of the light source from the assembled unit while retaining said first almost closed space, wherein a second elastic member is disposed between the light-transmissive protective plate and the display panel so as to surround a display area of the display panel.

13. A display apparatus, comprising:

a display panel for displaying images, a housing for supporting the display panel, a panel-supporting member to which the display panel and a drive circuit board comprising means for driving the display panel are attached, a first elastic member for attaching the panel-supporting member to the housing, a second elastic member for attaching the display panel to the housing, a third elastic member for attaching the display panel to the panel-supporting member, a light-transmissive protective plate disposed on a display surface side of the display panel and attached to the housing, a light source disposed on a back side of the display panel, a light transmission plate disposed between the display panel and the light source, so as to define a first almost closed space between the display panel and the light transmission plate, and a second almost closed space is defined by the display panel, the protective plate and the panel-supporting member, wherein the display panel, the light transmission plate and the protective plate are attached to the housing to form an assembled unit containing said first almost closed space, so as to allow detachment of the light source from the assembled unit retaining said first almost closed space.

14. A display apparatus, comprising:

a display panel for image display; and a housing assembly for affixing the display panel, said housing assembly including:

(a) a light-transmissive protective member disposed on a front side of the display panel;

(b) a light transmission member disposed on a back side of the display panel;

(c) a supporting member for supporting a driver for driving the display panel;

(d) a housing surrounding edges of the display panel;

(e) a first elastic member disposed between the display panel and the protective member so as to surround a display area of the display panel and define a first almost closed space between the display panel and the protective member; and (f) a second elastic member disposed between the display panel and the light transmission member along a periphery of the display panel so as to define a second almost closed space between the display panel and the light transmission member.

15. A display apparatus according to claim 14, wherein said second elastic member is disposed between the light transmission member and the display panel via the supporting member, said supporting member being disposed on the light transmission member.

16. An information transmission apparatus, comprising:

a graphic controller for outputting a data signal and a scanning scheme signal, a scanning signal control circuit for outputting scanning line address data and a scanning scheme signal, and a liquid crystal signal display apparatus according to any one of claims 1, 4, 9, 10, 11, 12, 13, and 14.

17. A display apparatus according to any one of claims 4, 11, 12 and 13, wherein said display panel comprises a pair of substrates and a liquid crystal disposed between the substrates.

18. A display apparatus according to claim 17, wherein said liquid crystal is a ferroelectric liquid crystal.

* * * * *

UNITED STATES PATENT AND TRADEMARK OFFICE
CERTIFICATE OF CORRECTION

PATENT NO. : 5,659,376

DATED : August 19, 1997

INVENTOR(S): MAKOTO UEHARA ET AL.

It is certified that error appears in the above-identified patent and that said Letters Patent is hereby corrected as shown below:

[54] TITLE

"LIGHT TRANSMISSIVE" should read --LIGHT-TRANSMISSIVE--.

[56] REFERENCES CITED

Foreign Patent Documents
"02093425" should read --2-093425--.
"03203773" should read --3-203773--.
"04106529" should read --4-106529--.

[57] ABSTRACT

Line 11, "retaina" should read --retains--.

COLUMN 1

Line 5, "LIGHT TRANSMISSIVE" should read
--LIGHT-TRANSMISSIVE--.
Line 34, "cover 100" should read --cover 110--.

COLUMN 3

Line 60, "surface" should read --surface of--.

COLUMN 4

Line 11, "unit," should read --unit 211,--.
Line 17, "applied" should read --applies--.

UNITED STATES PATENT AND TRADEMARK OFFICE
CERTIFICATE OF CORRECTION

PATENT NO. : 5,659,376

DATED : August 19, 1997

INVENTOR(S): MAKOTO UEHARA ET AL.

It is certified that error appears in the above-identified patent and that said Letters Patent is hereby corrected as shown below:

COLUMN 5

Line 9, "housing 302" should read --housings 302--.

COLUMN 6

Line 41, "case" should read --the case--.

COLUMN 7

Line 12, "raise" should read --rise--.

COLUMN 8

Line 53, "U-shaped" should read --U-shape--.

COLUMN 11

Line 3, "100C1" should read --100C2--.
    Line 51, "space 103A3" should read --space 100A3--.

COLUMN 12

Line 21, "protecting" should read --protective--.

COLUMN 14

Line 2, "FIG. 20" should read --FIG. 20,--.

UNITED STATES PATENT AND TRADEMARK OFFICE
CERTIFICATE OF CORRECTION

PATENT NO. : 5,659,376

DATED : August 19, 1997

INVENTOR(S) : MAKOTO UEHARA ET AL.　　　　Page 3 of 4

It is certified that error appears in the above-identified patent and that said Letters Patent is hereby corrected as shown below:

COLUMN 15

Line 41, "state 303" should read --plate 303--.

COLUMN 16

Line 12, "control" should read --application--.
Line 37, "Further," should read --Further, since--.

COLUMN 17

Line 10, "FIG. 25A" should read --FIGS. 25A--.

COLUMN 18

Line 34, "as" should be deleted.

COLUMN 19

Line 42, "panels," should read --panel,--.
Line 57, "space;" should read --space,--.
Line 59, "panel supporting" should read
   --panel-supporting--.
Line 60, "member;" should read --member,--.

UNITED STATES PATENT AND TRADEMARK OFFICE
CERTIFICATE OF CORRECTION

PATENT NO. : 5,659,376

DATED : August 19, 1997

INVENTOR(S) : MAKOTO UEHARA ET AL.

Page 4 of 4

It is certified that error appears in the above-identified patent and that said Letters Patent is hereby corrected as shown below:

<u>COLUMN 20</u>

Line 17, "panel supporting" should read
--panel-supporting--.

Signed and Sealed this

Twenty-fourth Day of March, 1998

Attest:

BRUCE LEHMAN

*Attesting Officer*         *Commissioner of Patents and Trademarks*